United States Patent
Kumar et al.

(10) Patent No.: US 10,708,182 B2
(45) Date of Patent: Jul. 7, 2020

(54) MPLS LSP CONNECTIVITY TEST WHEN THE INITIATOR ADDRESS IS UNKNOWN

(71) Applicant: Cisco Technology, Inc., San Jose, CA (US)

(72) Inventors: Nagendra Kumar, Bangalore (IN); Rajiv Asati, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 13/951,758

(22) Filed: Jul. 26, 2013

(65) Prior Publication Data
US 2015/0030026 A1    Jan. 29, 2015

(51) Int. Cl.
*H04L 12/723* (2013.01)
*H04L 12/26* (2006.01)
*H04L 12/751* (2013.01)

(52) U.S. Cl.
CPC .......... *H04L 45/50* (2013.01); *H04L 43/0811* (2013.01); *H04L 43/10* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 7,076,559 B1 * | 7/2006 | Ghanwani | H04L 45/04 370/352 |
| 7,246,175 B1 * | 7/2007 | Tappan | H04L 29/12358 370/392 |
| 7,463,591 B1 * | 12/2008 | Kompella | H04L 43/0811 370/225 |
| 7,936,780 B1 * | 5/2011 | Kompella | 370/466 |
| 7,940,695 B1 * | 5/2011 | Bahadur | H04L 43/0811 370/254 |
| 7,983,174 B1 * | 7/2011 | Monaghan | H04L 43/0817 370/242 |

(Continued)

OTHER PUBLICATIONS

Bahadur et al., "Mechanism for Performing Label Switched Path Ping (LSP Ping) over MPLS Tunnels", Nov. 2011, IETF, RFC 6424, pp. 1-22.*
Kompella et al., "Detecting Multi-Protocol Label Switched (MPLS) Data Plane Failures", Feb. 2006, IETF, RFC 4379, pp. 1-48.*

(Continued)

*Primary Examiner* — Steve R Young
(74) *Attorney, Agent, or Firm* — Campbell Stephenson LLP

(57) ABSTRACT

The present disclosure provides for carrying reachability information in an echo request message and/or an echo reply message, which can be used to reach an initiator when the initiator's address is unknown. An echo request message includes an FEC (forwarding equivalence class) stack that identifies a label switched path (LSP). The echo request message is received by a label switching routing element (LSR) on the LSP, and the echo request is originated by an initiator. In response to a detection that the FEC stack changes at the LSR, a segment reachability (SR) sub-TLV (type-length-value) element can be generated, where the SR sub-TLV includes reachability information that can be used to reach the initiator, and the reachability information includes an incoming label allocated by the LSR to reach the initiator.

8 Claims, 15 Drawing Sheets

(56) References Cited

U.S. PATENT DOCUMENTS

| | | | | |
|---|---|---|---|---|
| 8,339,973 | B1* | 12/2012 | Pichumani | H04L 43/10 370/248 |
| 8,718,060 | B2* | 5/2014 | Swallow | H04L 45/00 370/352 |
| 9,344,325 | B2* | 5/2016 | Jain | H04L 41/0668 |
| 9,608,898 | B2* | 3/2017 | Venkataraman | H04L 45/16 |
| 2006/0198321 | A1* | 9/2006 | Nadeau | H04L 43/50 370/254 |
| 2008/0095061 | A1* | 4/2008 | Hua | H04L 43/0811 370/248 |
| 2011/0164501 | A1* | 7/2011 | Dunbar | H04L 43/0805 370/236.2 |
| 2011/0274113 | A1* | 11/2011 | So | H04L 45/28 370/400 |

OTHER PUBLICATIONS

Thomas D. Nadeau et al., "Detecting MPLS Data Plane Failures in Inter-AS and inter-provider Scenarios," Network Working Group, Internet Draft, Category: Standards Track, expiration date Sep. 2007, draft-ietf-mplsinteras-1spping-00.text, dated Mar. 2007, pp. 1-18.

R. Zheng et al., "Relayed Echo Reply mechanism for LSP Ping," Network Working Group, Internet Draft, Updates: 4379 (if approved), Intended status: Standards Track, expires Sep. 12, 2013, draft-ietf-mpls-lsp, ping-relay-reply-00, dated Mar. 11, 2013, pp. 1-15.

K. Kompella et al., "Detecting Multi-Protocol Label Switched (MPLS) Data Plane Failures," Network Working Group, Request for Comments: 4379, Feb. 2006, pp. 1-50.

N. Bahadur et al., "Mechanism for Performing Label Switched Path Ping (LSP Ping) Over MPLS Tunnels," Internet Engineering Task Force (IETF), Request for Comments: 6424, Nov. 2011, pp. 1-23.

\* cited by examiner

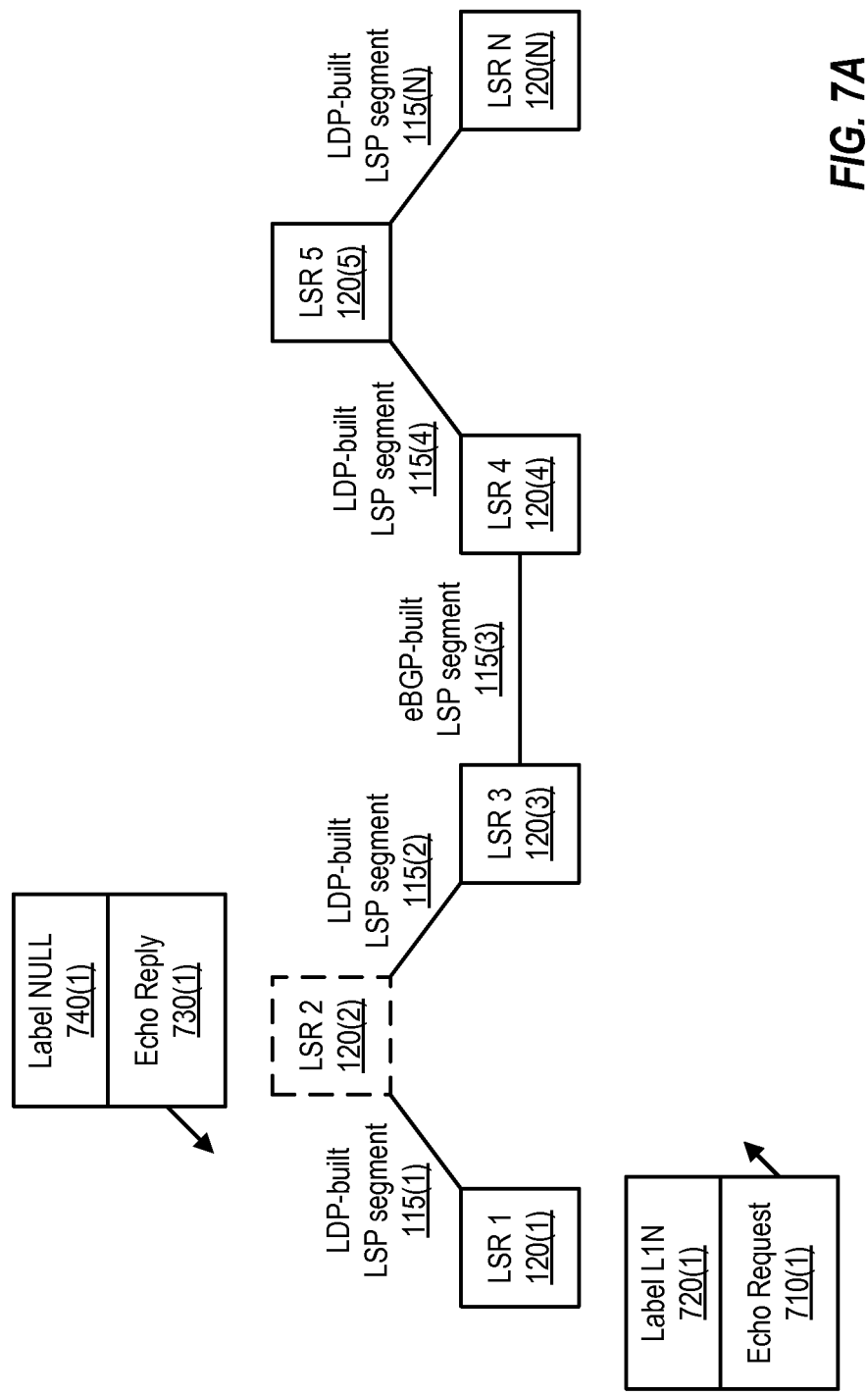

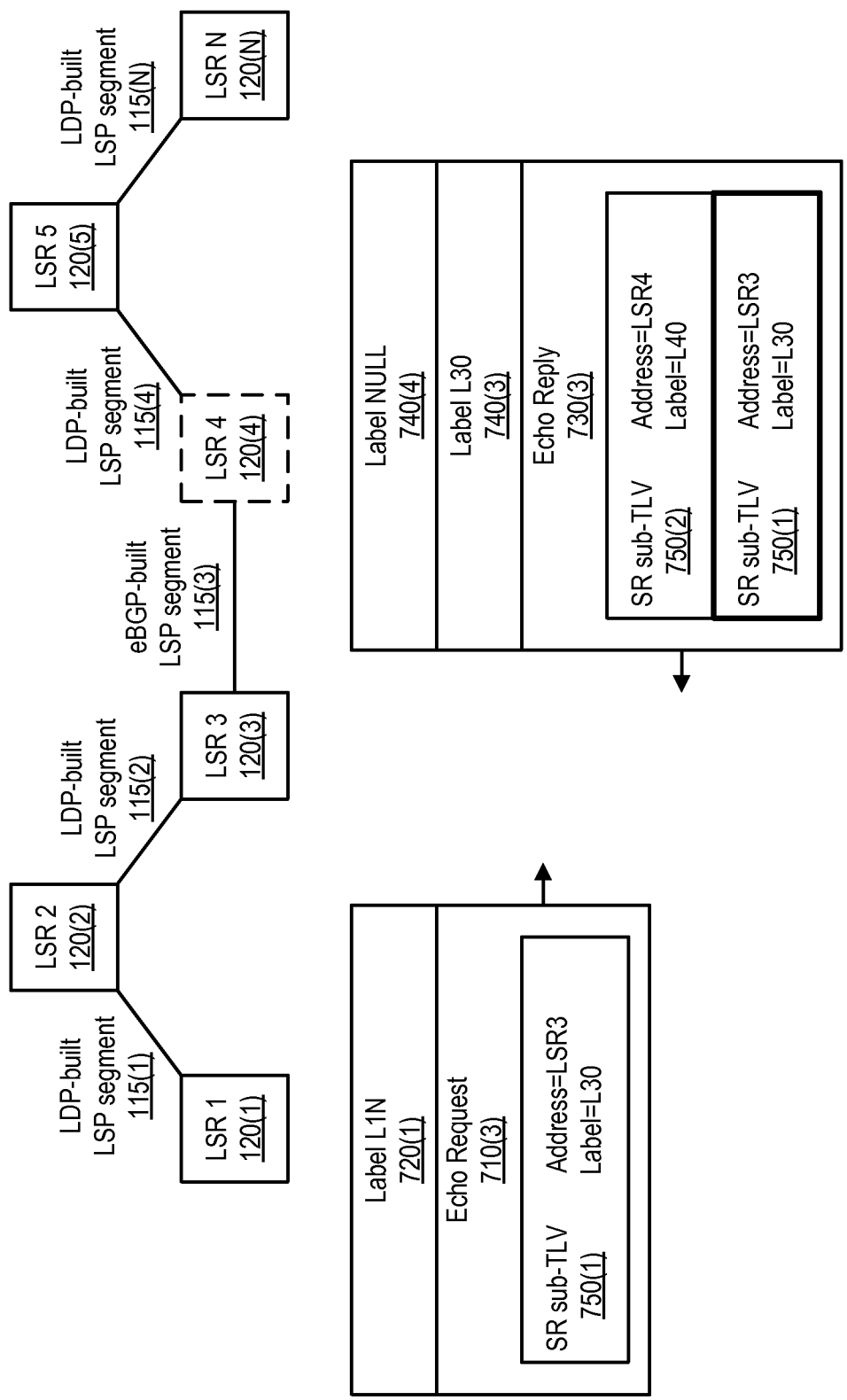

US 10,708,182 B2

MPLS LSP CONNECTIVITY TEST WHEN THE INITIATOR ADDRESS IS UNKNOWN

TECHNICAL FIELD

The present disclosure relates generally to MPLS (multiprotocol label switching) protocols and, more particularly, to performing an MPLS LSP (label switched path) connectivity test when the initiator address is unknown.

BACKGROUND

Businesses employ networks to interconnect their computers, servers, storage devices, and other network elements. As a business grows, so can its network, increasing the number of network elements coupled to the network, the number of network links, and also geographic diversity. A business' network elements can be scattered throughout a city, a state, a country, or the world. Many businesses establish connectivity between network elements at disparate geographic sites using various intermediate networked areas or domains, such as a third party provider's network. In order for the various intermediate networked domains to provide end-to-end connectivity between a business' network elements, connectivity tests may be performed to validate data transmission along paths through the various intermediate networked domains.

BRIEF DESCRIPTION OF THE DRAWINGS

A more complete understanding of the present disclosure may be acquired by referring to the following description and accompanying drawings, in which like references numbers indicate like features.

FIG. 7A-7E are block diagrams illustrating example message exchanges during an example connectivity test implementing the present disclosure, according to one embodiment.

Figure 1:
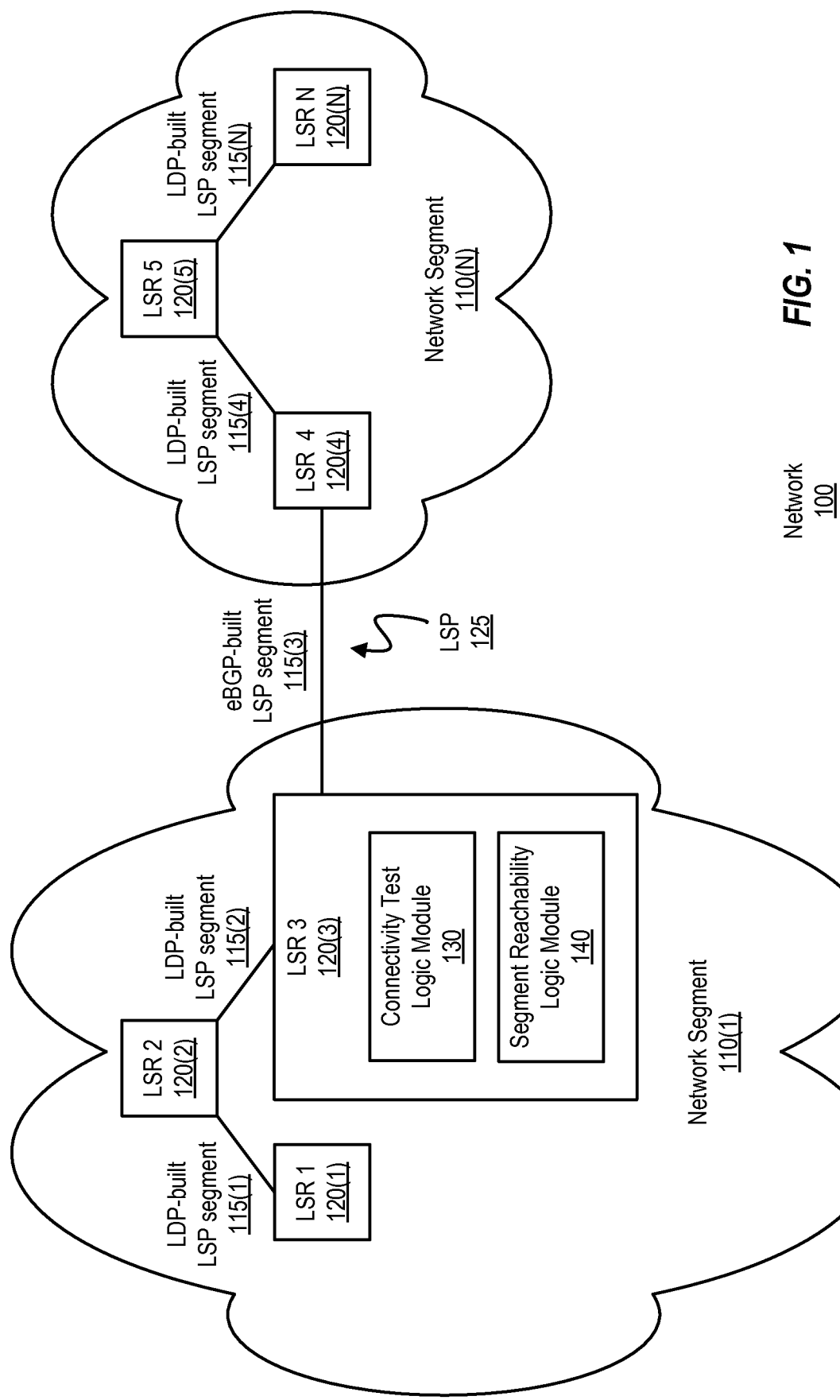
FIG. 1 is a block diagram illustrating components of an example network in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

The present disclosure provides for carrying reachability information in an echo request message and/or an echo reply message, which can be used to reach an initiator when the initiator's address is unknown. An echo request message includes an FEC (forwarding equivalence class) stack that identifies a label switched path (LSP). The echo request message is received by a label switching routing element (LSR) on the LSP, and the echo request is originated by an initiator. In response to a detection that the FEC stack changes at the LSR, a segment reachability (SR) sub-TLV (type-length-value) element can be generated, where the SR sub-TLV includes reachability information that can be used to reach the initiator, and the reachability information includes an incoming label allocated by the LSR to reach the initiator.

Example Embodiments

FIG. 1 is a block diagram illustrating components of an example network 100 in which the present disclosure can be implemented. Network 100 includes a number of network segments 110(1)-(N) that implement MPLS (multiprotocol label switching) and a number of label switching routing elements (LSRs) 120(1)-(N). Network 100 can also implement Inter-AS (Autonomous System) VPN (Virtual Private Network), Seamless/Unified MPLS, and Carrier Supporting Carrier (CSC). Examples of a network segment 110 include an autonomous system (AS), a customer network, a service provider network, a customer carrier network, a backbone network, a transport network, a core network, a network, a sub-network, an aggregate domain, a core domain, an access domain, a networked area, and/or a routing domain.

Each network segment includes a set of label switching routing elements (or LSRs). Each LSR 120 is configured to implement a routing protocol (e.g., an interior routing protocol, such as IGP (Interior Gateway Protocol), OSPF (Open Shortest Path First), IS-IS (Intermediate System to Intermediate System), EIGRP (Enhanced Interior Gateway Routing Protocol), and the like). Each LSR 120 is configured to exchange routing information with other LSRs within the same network segment and store the routing information in a local IP (Internet Protocol) routing table, which includes routes to various destinations in the network segment (also referred to as routes interior to a network segment, or more simply as interior routes). A destination with a route stored in the local IP routing table is referred to as being IP reachable (e.g., the known route reaches the destination). As illustrated, LSRs 120(1)-(3) are located in a same network segment 110(1) and exchange routing information with one another, and LSRs 120(4)-(N) are located in a same network segment 110(N) and exchange routing information with one another. However, LSRs within a network segment will likely not have any routing information for a destination outside of the network segment. Such an outside destination is referred to as being IP unreachable (e.g., there is no known route stored in the local IP routing table that reaches the outside destination). For example, LSR 120(1) is IP unreachable for LSRs 120(4)-(N). In other words, the IP address of LSR 120(1) is private to network segment 110(1) since the route to such an IP address is not distributed outside of network segment 110(1).

LSRs at the edge of a given network segment (or edge LSRs) are also configured to implement a reachability protocol (e.g., an exterior routing protocol or network reachability protocol, such as BGP (Border Gateway Protocol, also referred to as eBGP (exterior BGP)), and the like). Each edge LSR is configured to exchange reachability information with other edge LSRs of the same network segment and with edge LSRs of other network segments. An edge LSR is configured to store the reachability information (e.g., in a local BGP routing table and/or IP routing table), which includes routes to the various network segments in the network (also referred to as routes exterior to a network segment, or more simply as exterior routes). In the example illustrated, LSR 120(3) is an edge LSR of network segment 110(1) and LSR 120(4) is an edge LSR of network segment 110(N). Non-edge LSRs are referred to as core LSRs, such as LSRs 120(2) and 120(5). The exterior routes to the various network segments are shared with other edge LSRs, while the core LSRs do not receive such exterior routes.

A label switched path (LSP) can be built across network 100 (and across one or more network segments) from at least one ingress LSR to at least one egress LSR, and can pass through one or more transit LSRs between the ingress LSR and egress LSR. As illustrated LSP 125 spans LSRs 120(1), 120(2), 120(3), 120(4), 120(5), and 120(N), and includes LSP segments 115(1)-(N). Each LSP is defined by a set of labels. Labels are short, fixed length, locally significant identifiers that are used to identify a Forwarding Equivalence Class (FEC). An FEC represents packets that share a same requirement for transport (e.g., over the same path with the same forwarding treatment). Each LSP is associated with at least one FEC that specifies which packets are mapped to that LSP. In order to build an LSP, each LSR is configured to exchange labels with one another using one or more label distribution protocols (e.g., using LDP (Label Distribution Protocol), BGP-4 (Border Gateway Protocol version 4), RSVP-TE (Resource Reservation Protocol-Traffic Engineering), CR-LDP (Constraint-based Routing Label Distribution Protocol), and the like). A given LSR binds a label to each destination in the LSR's local routing tables, and distributes this label binding to its peers (e.g., labels for interior routes are exchanged among LSRs (such as LDP peers) in the same network segment and labels for exterior routes are exchanged with edge LSRs (such as BGP peers) of one or more network segments). Each LSR stores the labels in a label information base (LIB) and/or a label forwarding information base (LFIB) and uses the labels to forward (or label switch) a packet along an LSP toward the packet's destination.

An LSP that crosses network segments may be built using a number of different label distribution protocols. In the example illustrated in FIG. 1, LSRs 120(1)-(N) of network segments 110(1) and 110(N) implement LDP, and edge LSRs 120(3) and 120(4) further implement eBGP. An LSP 125 is built between LSR 120(1), which is an ingress LSR of LSP 125, and LSR 120(N), which is an egress LSR of LSP 125. As illustrated, LSP 125 includes two LDP-built LSP segments 115(1) and 115(2) in network segment 110(1), an eBGP-built LSP segment 115(3), and two LDP-built LSP segments 115(4) and 115(N) in network segment 110(N).

Since different label distribution protocols may define an FEC differently from one another, an LSP built by different label distribution protocols may be associated with a number of different FECs. For example, LDP-built LSP segments 115(1) and 115(2) of LSP 125 are associated with a first LDP FEC, eBGP-built LSP segment 115(3) is associated with an eBGP FEC, and LDP-built LSP segment 115(4) and 115(N) are associated with a second LDP FEC. The collection of various FECs associated with an LSP is referred to as an FEC stack.

As illustrated, each LSR 120 implements connectivity test logic module 130, which implements MPLS LSP connectivity test protocol. Connectivity test protocol is used to detect data plane failures in LSPs by exchanging MPLS echo request messages and MPLS echo reply messages. For example, an end-to-end connectivity test of an LSP can be performed in LSP ping mode to detect a fault within the LSP, while a transit connectivity test of an LSP can be performed in LSP traceroute mode to localize the fault.

In LSP ping mode and tracemode, an initiator (or LSR that initiates a connectivity test) tests an LSP by originating an echo request and sending the echo request toward the egress LSR of the LSP being tested. The echo request includes an FEC stack that identifies the LSP being tested. The initiator expects to receive an echo reply from a responder. In ping mode, transit LSRs of the LSP forward the echo request along the LSP toward the egress LSR, where the egress LSR acts as the responder and sends an echo reply to the initiator. In traceroute mode, each transit LSR acts as a responder and sends an echo reply to the initiator. The responder (whether an egress LSR or a transit LSR) should know the initiator's address in order to respond. However, the responder may not know the initiator's address if the initiator is IP unreachable (e.g., the route to reach the initiator is not in the responder's local routing tables) and cannot send an echo reply to the initiator. Thus, when using traditional MPLS connectivity test protocol to test an LSP that spans more than one network segment, an initiator may not successfully receive an echo reply from responders outside of the network segment in which the initiator is located.

The present disclosure provides for carrying reachability information in an echo request message and/or an echo reply message that can be used to reach the initiator. When a responder receives an echo request and does not know the initiator's address, the responder can use the reachability information collected in the echo request to label switch an echo reply back to the initiator along the same path taken by the echo request. The present disclosure provides for a new sub-TLV (type-length-value) element to carry the reachability information, which is referred to as a segment reachability sub-TLV. The extension to MPLS LSP connectivity test logic to use the new segment reachability sub-TLV is illustrated as segment reachability (SR) logic module 140, also implemented on each LSR 120. These components are discussed in further detail below.

Network 100 can utilize Ethernet, IEEE 802.11x, or some other communications protocol. In light of the present disclosure, it will be appreciated that network 100 can include other components such as routers, firewalls and the like that are not germane to the discussion of the present disclosure and will not be discussed further herein. It will also be appreciated that other configurations are possible. For example, a much larger number of network segments 110(1)-(N), LSP segments 115(1)-(N), and/or LSRs 120(1)-(N) than the number shown can be implemented in the network, and so on.

The letter N is used to indicate a variable number of devices or components. For example, a variable number of network segments 110(1)-(N), LSP segments 115(1)-(N), and LSRs 120(1)-(N) are implemented in the network. Although the letter N is used in describing a variable number of instances of each of these different devices and components, a repeated use of the letter N does not necessarily indicate that each device and component has a same number of N instances implemented in the network.

Figure 2:
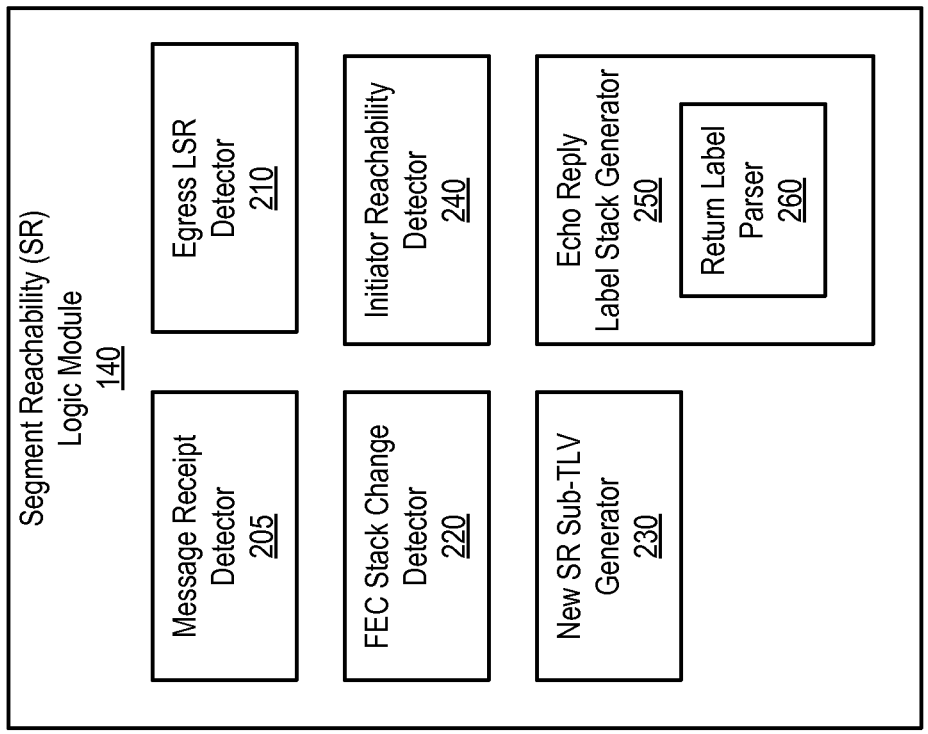
FIG. 2 is a block diagram illustrating components of an example segment reachability logic module in which the present disclosure can be implemented, according to one embodiment.

FIG. 2 is a block diagram illustrating components of an example segment reachability (SR) logic module 140 in which the present disclosure can be implemented. SR logic module 140 is configured to be implemented on an LSR 120 and is configured to communicate with an existing MPLS connectivity test logic module 130 also implemented on the LSR 120. SR logic module 140 includes a message receipt detector 205, an egress LSR detector 210, an FEC stack change detector 220, an initiator reachability detector 240, a new segment reachability (SR) sub-TLV generator 230, and an echo reply label stack generator 250 that in turn includes a return label parser 260. Each component is discussed in further detail below.

Message processing implemented by SR logic module 140 is configured to be triggered by message receipt detector 205, such as when an echo request message is received at the LSR on which SR logic module 140 is implemented. Message receipt detector 140 is configured to detect that an echo request message has been received at a port of the LSR. Message processing is further discussed below in connection with FIGS. 9A and 9B.

Egress LSR detector 210 is configured to detect whether an LSR that receives an echo request message is an egress LSR of the LSP identified in the echo request message (e.g., the LSP being tested). Connectivity test logic module includes a mechanism for determining whether a receiving LSR is an egress LSR of the LSP being tested. For example, the connectivity test mechanism consults the receiving LSR's local routing tables and/or label forwarding information base (LFIB) to determine whether the receiving LSR is an egress LSR of the LSP being tested (which is used to trigger generation of a terminal or final echo reply message during a traditional connectivity test). Egress LSR detector 210 interfaces with the connectivity test mechanism to detect the determination made by the connectivity test mechanism, which indicates whether the receiving LSR is an egress LSR of the LSP being tested.

FEC stack change detector 220 is configured to detect whether an FEC stack change occurs at the receiving LSR. Connectivity test logic module includes a mechanism for determining whether the FEC stack (which identifies the LSP being tested) changes at the receiving LSR. For example, the connectivity test mechanism consults the receiving LSR's control plane to determine if a FEC stack change occurs at the receiving LSR and triggers generation of an FEC stack change TLV in response to a FEC stack change (which is used during a traditional connectivity test). FEC stack change detector 220 interfaces with the connectivity test mechanism to detect the determination made by the connectivity test mechanism, which indicates whether the FEC stack changes at the receiving LSR (e.g., FEC stack change detector 220 detects whether an FEC stack change TLV has been triggered by connectivity test logic module).

Initiator reachability detector 240 is configured to detect whether the initiator of the echo request is IP reachable. Initiator reachability detector 240 is configured to detect reachability of the initiator by either using the reachability information provided in a received SR sub-TLV (when the reachability information is present), or (if the reachability information is not present) by consulting the receiving LSR's local routing tables and/or LFIB to determine if the initiator is reachable (e.g., whether the receiving LSR has a known route for the initiator's address).

New SR sub-TLV generator 230 is configured to generate a new segment reachability (SR) sub-TLV (type-length-value) element, and to add (or insert) the new SR sub-TLV element into an echo request message or echo reply message, depending on the connectivity test being executed (as further discussed below). An example SR sub-TLV is further discussed below in connection with FIG. 3. An example echo request message is further discussed below in connection with FIGS. 4A and 4B. An example echo reply message is further discussed below in connection with FIG. 5.

Echo reply label stack generator 250 is configured to generate a return label stack and impose the return label stack and an outer label on the echo reply, as further discussed below in connection with FIG. 6. Echo reply label stack generate 250 includes return label parser 260, which is configured to parse return labels from a number of SR sub-TLVs to form or build the return label stack, as also further discussed below in connection with FIG. 6.

Figure 3:
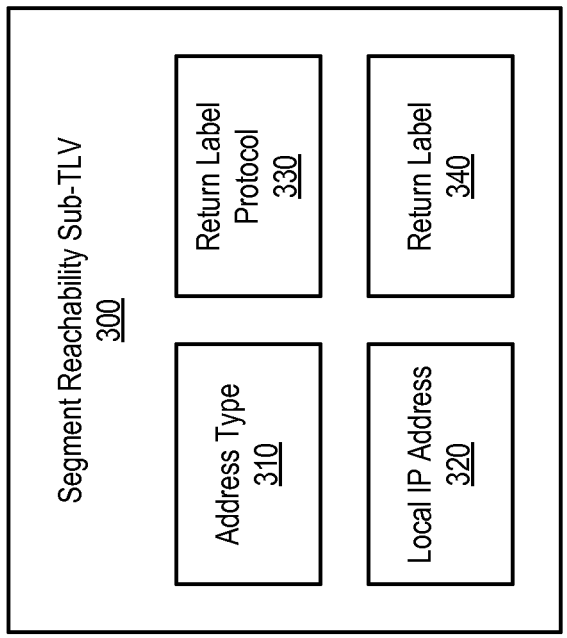
FIG. 3 is a block diagram illustrating components of an example segment reachability sub-TLV, according to one embodiment.

FIG. 3 is a block diagram illustrating components of an example segment reachability (SR) sub-TLV 300. SR sub-TLV 300 is generated by SR logic module 140 in cooperation with connectivity test logic module 130, where SR sub-TLV 300 is originated by the LSR on which logic modules 130 and 140 are implemented (where the LSR is also referred to as the originating LSR of the SR sub-TLV). One or more SR sub-TLVs can be included in a downstream detailed mapping (DDMAP) TLV of an echo reply and are stored as a stack of SR sub-TLVs (also referred to as a SR sub-TLV stack) in the DDMAP TLV. SR sub-TLV 300 includes an address type 310, a local IP address 320, a return label protocol 330, and a return label 340. Each component is discussed in further detail below.

Address type 310 identifies the address type of local IP address 320, such as IPv4 or IPv6. Local IP address 320 is the IP address of the LSR that originates SR sub-TLV 300 (and adds SR sub-TLV 300 to an echo reply or to a forwarded echo request) in response to detection of an FEC stack change. Local IP address 320 must be reachable on the LSP segment where the FEC stack change occurs.

Return label protocol 330 identifies the protocol that owns return label 340, such as BGP, RSVP, LDP, and the like. Return label 340 identifies a local label that the originating LSR has allocated and is using as the incoming label for either the initiator's address or for the IP address encoded in the top-most existing SR sub-TLV (e.g., local IP address 320 of the top-most SR sub-TLV of the SR sub-TLV stack), as further discussed below in connection with FIG. 6.

Figure 4B:
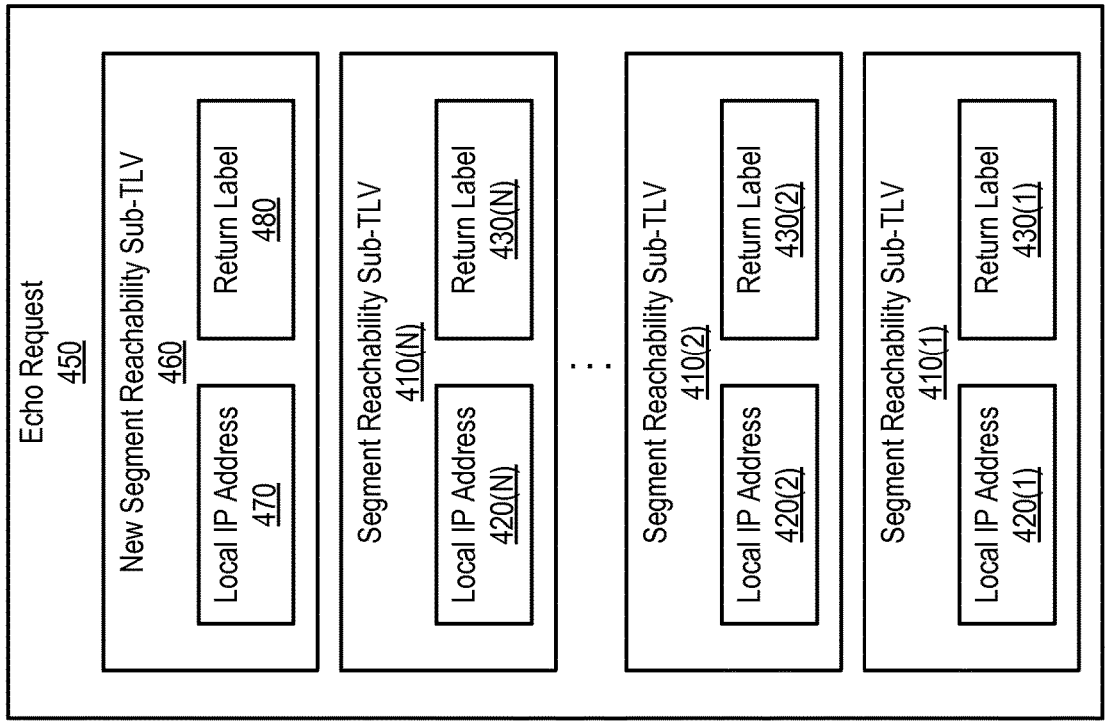
FIG. 4A-4B are block diagrams illustrating components of an example echo request message including one or more segment reachability sub-TLVs, according to one embodiment.
Figure 4A:
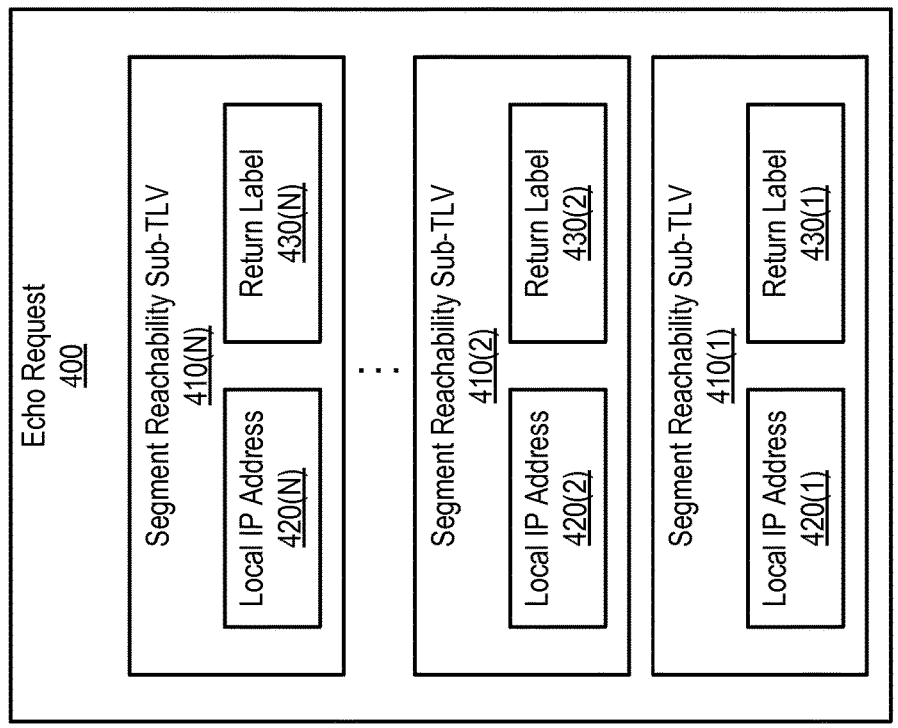

FIG. 4A is a block diagram illustrating components of an example echo request message 400 including one or more existing segment reachability sub-TLVs. Although not shown, echo request message 400 includes a DDMAP TLV that includes SR sub-TLVs 410(1)-(N). One or more SR sub-TLVs 410(1)-(N) are stored within echo request 400 as a stack of SR sub-TLVs, where a most-recently added SR sub-TLV is located at the top of the stack (illustrated as SR sub-TLV 410(N) and referred to as the top-most SR sub-TLV of the SR sub-TLV stack), and the oldest added SR sub-TLV is located at the bottom of the stack (illustrated as SR sub-TLV 410(1)). Each SR sub-TLV 410 includes a corresponding local IP address 420 and corresponding return label 430.

As used herein, an existing stack of SR sub-TLVs (or stack of existing SR sub-TLVs) refers to the one or more SR sub-TLVs present in an echo request message received by an LSR (such as a transit LSR or an egress LSR). An existing stack of SR sub-TLVs can be copied over to a new echo request message (as further discussed below in connection with FIG. 4B) or to an echo reply message (as further discussed below in connection with FIG. 5). Although a new SR sub-TLV can be added or pushed to the top of an existing stack of SR sub-TLVs in an echo reply message (or in a new or forwarded echo request message), the new SR sub-TLV is not considered part of the existing stack of SR sub-TLVs since the new SR sub-TLV is not present in the stack of SR sub-TLVs as it existed in the received echo request message.

It is noted that an initial echo request message (e.g., the first echo request sent to test the LSP) sent from an initiator may not include an SR sub-TLV stack, such as in a transit connectivity test using traceroute mode, since SR sub-TLVs are added to DDMAP by transit LSRs in response to detecting an FEC stack change at the transit LSR. In traceroute mode, an echo reply message is generated in response to receiving an echo request message, as further discussed below in connection with FIG. 5.

In one embodiment of ping mode, when a transit LSR receives echo request message 400, the transit LSR forwards echo request message 400 toward the egress LSR, just as it would forward any other data packet. In such an embodiment, the transit LSR would not check the payload of the echo request message and would not update the echo request message with a new SR sub-TLV. In such an embodiment, segment reachability information can be initially collected using a transit connectivity test in traceroute mode, and the collected segment reachability information can be included in the initial echo request message of an end-to-end connectivity test in ping mode. Alternative embodiments of ping mode are further discussed below in connection with FIG. 4B.

FIG. 4B is a block diagram illustrating components of an example echo request message 450 that includes a new segment reachability sub-TLV, as used in alternative embodiments discussed below.

In one alternative embodiment of ping mode, when a transit LSR receives echo request message 400 and an FEC stack change is detected at the transit LSR, the transit LSR adds a new SR sub-TLV 460 to echo request message 400 to produce updated echo request message 450 (e.g., new SR sub-TLV 460 is added to the top of existing stack of SR sub-TLVs 410(1)-(N), or is added as part of a new SR sub-TLV stack (not shown)). New SR sub-TLV 460 includes a corresponding local IP address 470 (of the transit LSR that received echo request 400) and a corresponding return label 480. In the embodiment illustrated, return label 480 is the label allocated by the transit LSR (that received echo request 400) to reach local IP address 420(N) of the top-most SR sub-TLV 410(N) of the existing stack of SR sub-TLVs. Updated echo request message 450 is then forwarded to the next hop LSR toward the egress LSR of the LSP being tested.

In another alternative embodiment of ping mode, when a transit LSR receives echo request message 400 and an FEC stack change is detected at the transit LSR, the transit LSR generates a new echo request message 450, copies the DDMAP (including a SR sub-TLV stack, if any) from received echo request message 400 into new echo request message 450, and adds a new SR sub-TLV to new echo request message 450 (e.g., new SR sub-TLV 460 is added to the top of existing stack of SR sub-TLVs 410(1)-(N), or is added as part of a new SR sub-TLV stack (not shown)). New echo request message 450 is then forwarded to the next hop LSR toward the egress LSR of the LSP being tested.

Figure 5:
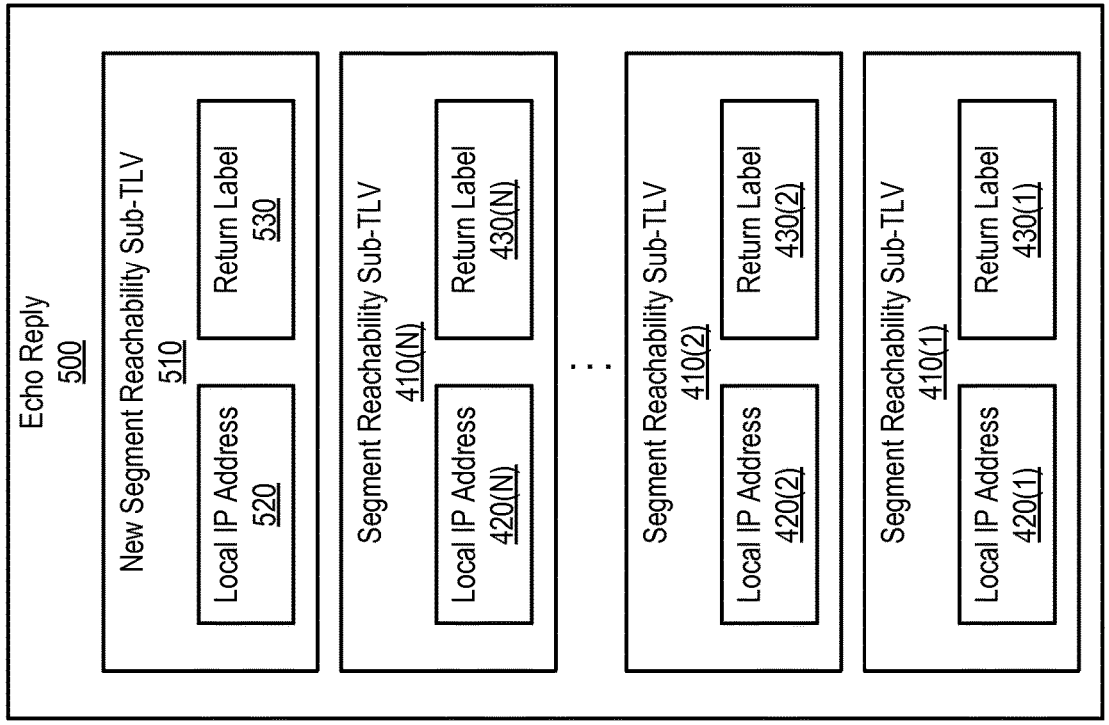
FIG. 5 is a block diagram illustrating components of an example echo reply message including one or more segment reachability sub-TLVs, according to one embodiment.

FIG. 5 is a block diagram illustrating components of an example echo reply message 500 including one or more segment reachability sub-TLVs. Although not shown, echo reply message 500 includes a DDMAP TLV that includes SR sub-TLVs 410(1)-(N). One or more SR sub-TLVs 410(1)-(N) are stored within echo reply message 500 as a stack of SR sub-TLVs, as discussed above. A new SR sub-TLV is added to an echo reply message either at the top of an existing SR sub-TLV stack (which was copied over from a received echo request message), or (if no SR sub-TLV stack exists in the received echo request message) as the first SR sub-TLV of a new SR sub-TLV stack that is added to the echo reply message. As discussed above, a new SR sub-TLV that is added to the top of an existing SR sub-TLV stack is not considered part of the existing SR sub-TLV since the new SR sub-TLV is not present in the received echo request message.

In one embodiment of traceroute mode, when a transit LSR receives echo request message 400 and an FEC stack change is detected at the transit LSR, the transit LSR generates echo reply message 500, copies the DDMAP (including a SR sub-TLV stack, if any) from received echo request message 400 into echo reply message 500, and adds a new SR sub-TLV to echo reply message 500 (e.g., new SR sub-TLV 510 is added to the top of existing stack of SR sub-TLVs 410(1)-(N), or is added as part of a new SR sub-TLV stack (not shown)). Echo reply message 500 is then forwarded to the initiator (as further discussed below in connection with FIG. 6).

In one embodiment of traceroute mode, when the initiator receives echo reply message 500 from a transit LSR, the initiator copies the DDMAP (including a SR sub-TLV stack, if any) from echo reply message 500 into the next echo request message. The next echo request message is sent to the next hop transit LSR toward the egress LSR of the LSP being tested.

In an embodiment of ping mode and/or traceroute mode, when an egress LSR of the LSP being tested receives echo request message 400, the egress LSR generates echo reply message 500, and forwards echo reply message 500 to the initiator (as further discussed below in connection with FIG. 6). In an alternative embodiment, the egress LSR may also copy the DDMAP (including an SR sub-TLV stack, if any) from received echo request message 400 into echo reply message 500.

In an embodiment of ping mode and/or traceroute mode, when the initiator receives echo reply message 500 from an egress LSR, the connectivity test is complete and indicates that the LSP has valid end-to-end connectivity.

In the event that the initiator does not successfully receive an echo reply message 500 from an LSR (either a transit LSR or an egress LSR) during a connectivity test, the echo reply message may not have used the correct labels for the return path and may have resulted in a false connectivity failure (e.g., for some reason, the echo reply message cannot return along the same path taken by the echo request message). In such an event, the initiator can optionally perform a subsequent connectivity test using a relayed reply mode, further discussed in IETF draft for Relayed Echo Reply Mechanism For LSP Ping, dated Mar. 11, 2013. The relayed reply mode uses a relayed echo reply that has a destination IP address of the first routable IP address from the relay node address stack (instead of the initiator LSR). Thus, a relayed echo reply requires an L3 (layer 3) rewrite of the relayed echo reply (as opposed to simply label switching the echo reply, as discussed herein).

Figure 6:
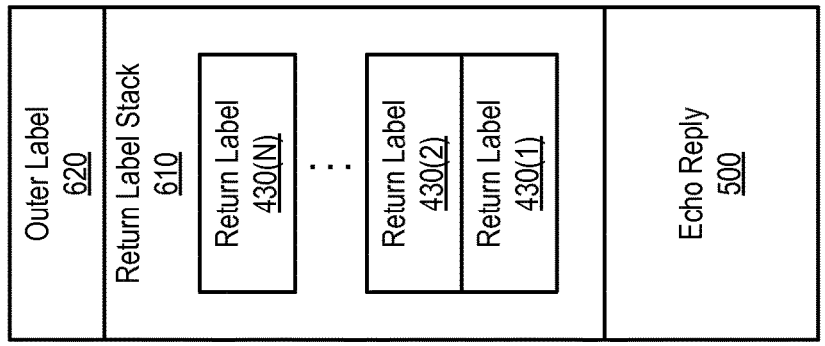
FIG. 6 is a block diagram illustrating components of an example return label stack for an echo reply message, according to one embodiment.

FIG. 6 is a block diagram illustrating components of an example return label stack 610 for an echo reply message 500. When an LSR (such as a transit LSR or an egress LSR) receives echo request message 400 and the initiator of echo request message 400 is IP unreachable, the LSR can use the reachability information stored within echo request message 400 (e.g., stored in one or more SR sub-TLVs of the received echo request message) to forward echo reply message 500 back to the initiator. The reachability information includes local IP address 420 and return label 430 stored in SR sub-TLVs 410(1)-(N), which is used to build a return label stack 610 for an echo reply message.

Return label stack 610 is generated by parsing the existing stack of SR sub-TLVs 410(1)-(N) of echo request message 500 and respectively retrieving return labels 430(1)-(N) from SR sub-TLVs 410(1)-(N). In the example illustrated, return label 430(1) is retrieved (or extracted) from SR sub-TLV 410(1), return label 430(2) is retrieved (or extracted) from SR sub-TLV 410(2), and so on. Return labels 430(1)-(N) are used to build return label stack 610, where the return labels are kept in the same order (or same sequence) in return label stack 610 as the order (or sequence) of the return labels' corresponding SR sub-TLVs in the SR sub-TLV stack. For example, return label 430(1) is located at the bottom of return label stack 610, as its corresponding SR sub-TLV 420(1) was located at the bottom of the SR sub-TLV stack, while return label 430(2) is located next in sequence in return label stack 610, as its corresponding SR sub-TLV 410(2) was located next in sequence in the SR sub-TLV stack, and so on.

Since return labels 430(1)-(N) are sequentially collected in the SR sub-TLV stack as the echo request travels or progresses away from the initiator, the sequence of labels included in return label stack 610 provides a return path to the initiator via the path taken by the echo request (e.g., the labels included in return label stack 610 indicate a return path through a number of transit LSRs that the echo reply message can follow to reach the initiator). Return label stack 610 is imposed on (e.g., pushed onto, added to, appended to, inserted into, or encapsulates) echo reply message 500, if there is an existing stack of SR sub-TLVs in a received echo request message.

The LSR also imposes an outer label 620 on echo reply message 500 that is an outgoing label allocated in the LSR's local forwarding table for either the initiator (if IP reachable) or for the local IP address in the top-most SR sub-TLV of the existing SR sub-TLV stack (if the initiator is IP unreachable). In the example illustrated, outer label 620 is allocated for local IP address 420(N) of the top-most SR sub-TLV 410(N) of the existing SR sub-TLV stack. If the LSR having local IP address 420(N) is directly connected to the LSR sending the echo reply, outer label 620 may be the NULL label. Echo reply message 500 is label switched back to the initiator using the sequence of one or more labels (including the return label stack and the outer label) imposed on echo reply message 500, even though the IP address of the initiator is unknown (or IP unreachable).

FIG. 7A-7E are block diagrams illustrating an example connectivity test in the example network 100 of FIG. 1, according to the present disclosure. LSR 1 is the initiator that is testing LSP 125, which spans LSR 1 to LSR N. FIG. 7A-7E illustrates various echo request/echo reply message exchanges made during a transit connectivity test in traceroute mode.

As illustrated in FIG. 7A, LSR 1 is the initiator that transmits an initial echo request 710(1) to begin the transit connectivity test. As noted above, echo request 710(1) does not include an SR sub-TLV. Echo request 710(1) is imposed with label L1N 720(1), which is the label that LSR 1 uses to reach LSR N. Echo request 710(1) is transmitted to the next hop LSR along LSP 125, which is LSR 2.

LSR 2 receives echo request 710(1), where LSR 2 acts as a responder (as illustrated by the broken line around LSR 2) and generates an echo reply 730(1). Since no FEC stack change is detected at LSR 2, LSR 2 need not add a new SR sub-TLV to echo reply 730(1). Also, since no SR sub-TLVs exist in the received echo request 710(1), there are no existing SR sub-TLVs to copy over to echo reply 730(1) and no return labels to impose on echo reply 730(1). Finally, since the initiator LSR 1 is IP reachable (since no existing SR sub-TLVs are present in received echo request 710(1) and the local routing tables and/or LFIB indicate LSR 1 is reachable), LSR 2 imposes the outgoing label that LSR 2 uses to reach the initiator as the outer label on echo reply 730(1). In this case, since the initiator LSR 1 is directly connected to responder LSR 2, the label imposed on echo reply 730(1) is NULL label 740(1). Echo reply 730(1) is transmitted back to initiator LSR 1.

Figure 7B:
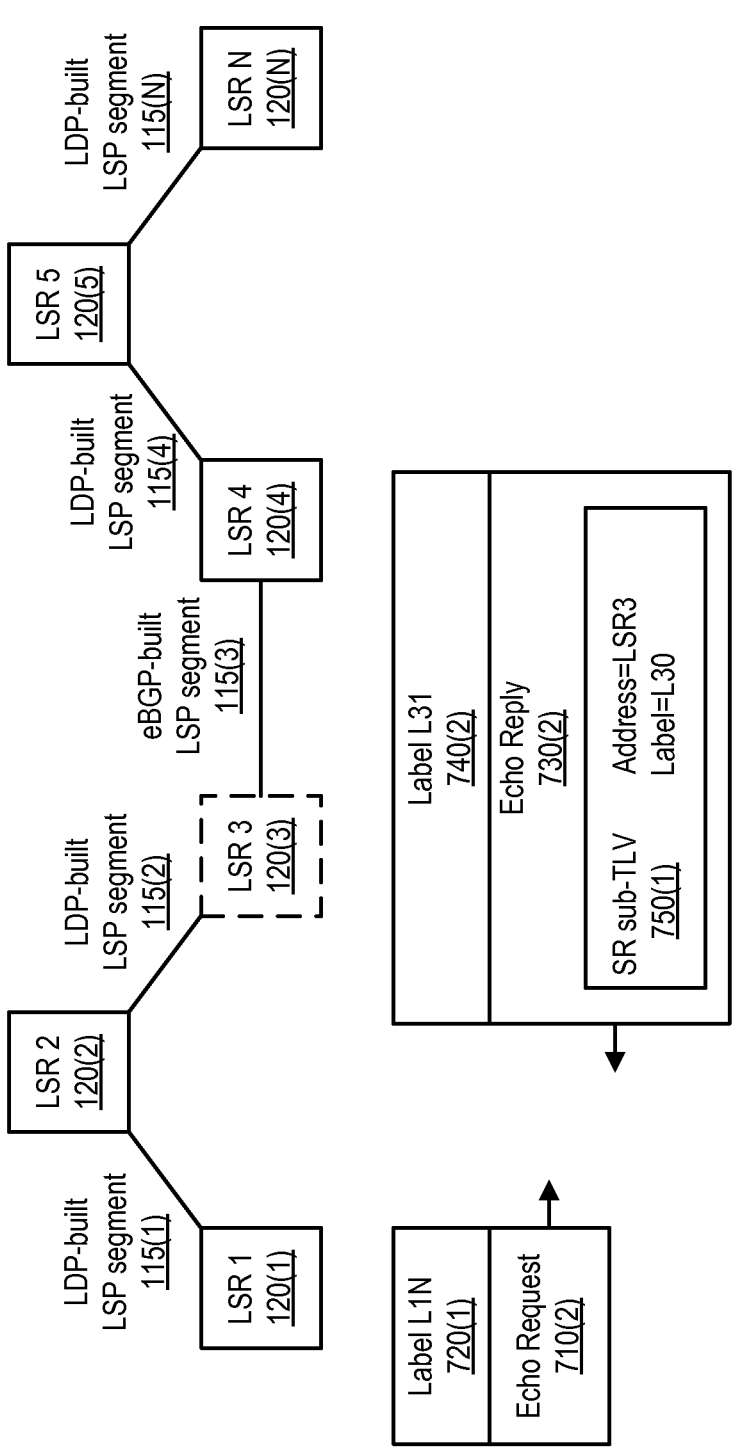

FIG. 7B illustrates a second echo request 710(2) generated by initiator LSR 1. Since no SR sub-TLVs existed in echo reply 730(1), there are no existing SR sub-TLVs to copy over to subsequent echo request 710(2). Echo request 710(2) is transmitted to the next hop LSR along LSP 125, which is LSR 3. LSR 3 acts as a responder (as illustrated by the broken line) and generates echo reply 730(2). An FEC stack change is detected at LSR 3, where LSP 125 changes from LDP-built LSP segment 115(2) to an eBGP-built LSP segment 115(3). In response, LSR 3 adds a new SR sub-TLV 750(1) to echo reply 730(2) (e.g., adds SR sub-TLV 750(1) as a first SR sub-TLV of a new SR sub-TLV stack that is added to echo reply 730(2)). SR sub-TLV 750(1) includes the IP address of LSR 3 that is reachable on the next segment, or eBGP-built LSP segment 115(3). SR sub-TLV 750(1) also includes return label L30, which is the incoming label that LSR 3 allocated for the initiator (e.g., the incoming/outgoing label pair stored in LSR 3's LFIB for LSR 1 is L30/L31).

Since no SR sub-TLVs exist in the received echo request 710(2), there are no existing SR sub-TLVs to copy over to echo reply 730(2) and no return labels to impose on echo reply 730(2). Finally, since initiator LSR 1 is IP reachable (since no existing SR sub-TLVs are present in received echo request 710(2) and the local routing tables and/or LFIB indicate LSR 1 is reachable), LSR 3 imposes the outgoing label that LSR 3 uses to reach the initiator as the outer label on echo reply 730(2). In this case, LSR 3 imposes the label L31 740(2) that is allocated for initiator LSR 1. Echo reply 730(2) is label switched back to initiator LSR 1.

FIG. 7C illustrates a third echo request 710(3) generated by initiator LSR 1. Since echo reply 730(2) included an existing SR sub-TLV 750(1), that SR sub-TLV 750(1) is copied over to subsequent echo request 710(3). Echo request 710(3) is transmitted to the next hop LSR along LSP 125, which is LSR 4. LSR 4 acts as a responder (as illustrated by the broken line) and generates echo reply 730(3). Since echo request 710(3) includes existing SR sub-TLV 750(1), that SR sub-TLV 750(1) is copied over to echo reply 710(3) (which is illustrated by a thicker solid line). An FEC change is also detected at LSR 4, where LSP 125 changes from eBGP-built LSP segment 115(3) to LDP-built LSP segment 115(4). In response, LSR 4 adds a new SR sub-TLV 750(2) to echo reply 730(3) (e.g., adds SR sub-TLV 750(2) to the top of the existing SR sub-TLV stack that includes SR sub-TLV 750(1)). SR sub-TLV 750(2) includes the reachable IP address of LSR 4 on the next segment, or LDP-built LSP segment 115(4). SR sub-TLV 750(2) also includes return label L40, which is the incoming label that LSR 4 allocated for the IP address in the top-most SR sub-TLV of the existing SR sub-TLV stack (e.g., the incoming/outgoing label pair stored in LSR 4's LFIB for LSR 3 is L40/L43).

Finally, since initiator LSR 1 is IP unreachable at LSR 4 (as indicated by the existing SR sub-TLV in received echo request 710(3)), LSR 4 generates a return label stack for echo reply 730(3) by extracting the return labels from the existing SR sub-TLV stack (e.g., extracting return label L30 from existing SR sub-TLV 750(1)). LSR 4 imposes the return label stack on echo reply 730(3), which is illustrated as label L30 740(3). LSR 4 also imposes the outgoing label that LSR 4 uses to reach the IP address in the top-most SR sub-TLV of the existing SR sub-TLV stack as the outer label of echo reply 730(3). As illustrated, the top-most SR sub-TLV in the existing stack is SR sub-TLV 750(1) (e.g., a stack of one), which includes the IP address for LSR 3. However, since LSR 4 is directly connected to LSR 3, LSR 4 imposes the NULL label 740(4). Echo reply 730(3) is label switched back to initiator LSR 1.

Figure 7D:
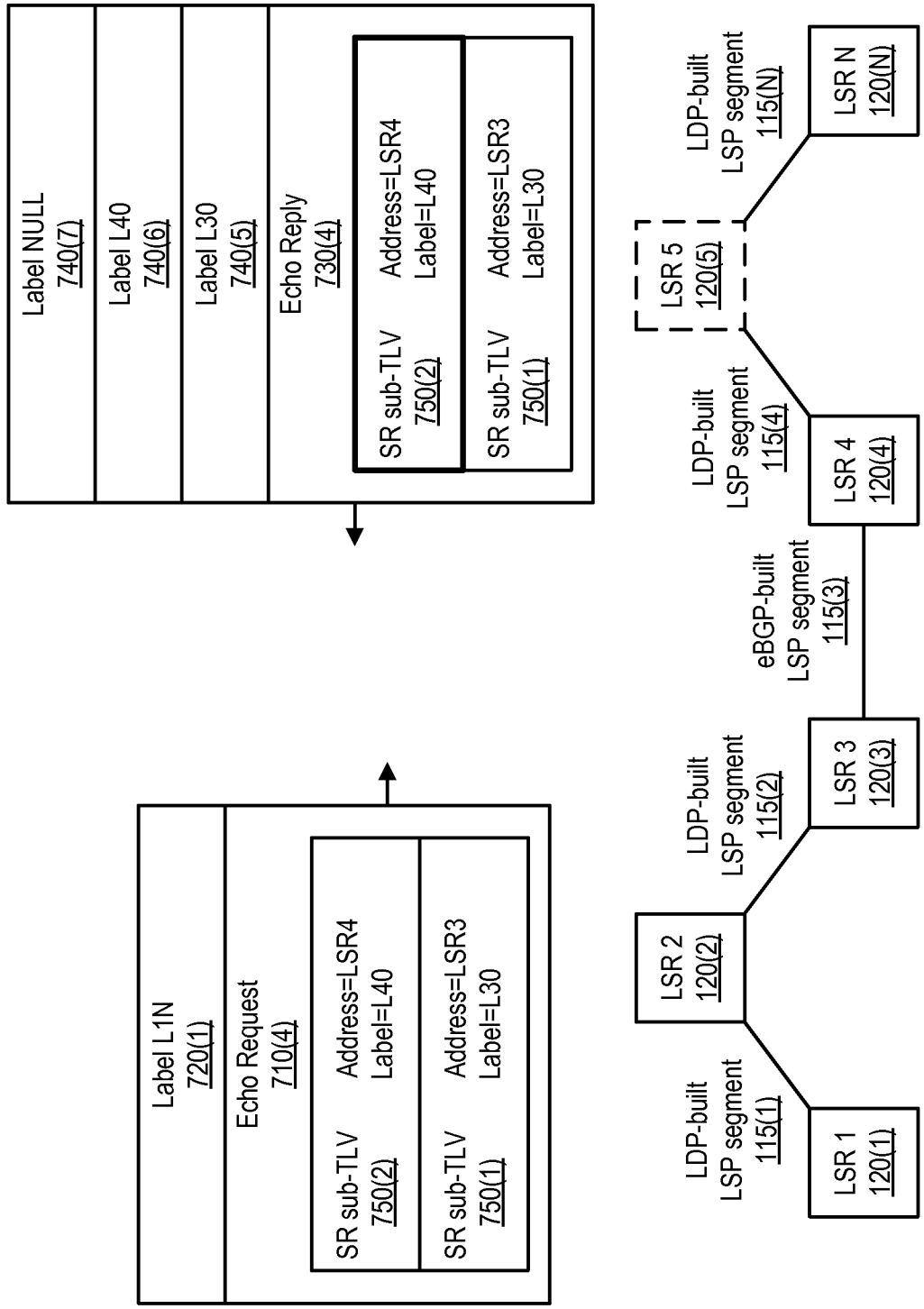

FIG. 7D illustrates a fourth echo request 710(4) generated by initiator LSR 1. Echo reply 730(3) included existing SR sub-TLVs 750(1) and 750(2), which are copied over to subsequent echo request 710(4). Echo request 710(4) is transmitted to the next hop LSR along LSP 125, which is LSR 5. LSR 5 acts as a responder (as illustrated by the broken line) and generates echo reply 730(4). Echo request 710(4) includes existing SR sub-TLVs 750(1) and 750(2), which are copied over to echo reply 740(4). No FEC change is detected at LSR 4, so there is no need for LSR 4 to add a new SR sub-TLV to the existing stack of SR sub-TLVs. Since initiator LSR 1 is IP unreachable at LSR 5 (as indicated by the existing SR sub-TLVs in received echo request 710(4)), LSR 5 generates a return label stack for echo reply 730(4) by extracting the return labels from the existing SR sub-TLV stack (e.g., extracting return label L30 and L40 from SR sub-TLVs 750(1) and 750(2)). LSR 5 imposes the return label stack on echo reply 730(4), which is illustrated as label L30 740(5) and label L40 740(6). LSR 5 also imposes the outgoing label that LSR 5 uses to reach the IP address in the top most SR sub-TLV of the existing SR sub-TLV stack as the outer label of echo reply 730(4). As illustrated, the top-most SR sub-TLV in the existing stack is SR sub-TLV 750(2) (and is outlined in a thicker solid line), which includes the IP address for LSR 4. Since LSR 5 is directly connected to LSR 4, LSR 5 imposes the NULL label 740(7). Echo reply 730(4) is label switched back to initiator LSR 1.

Figure 7E:
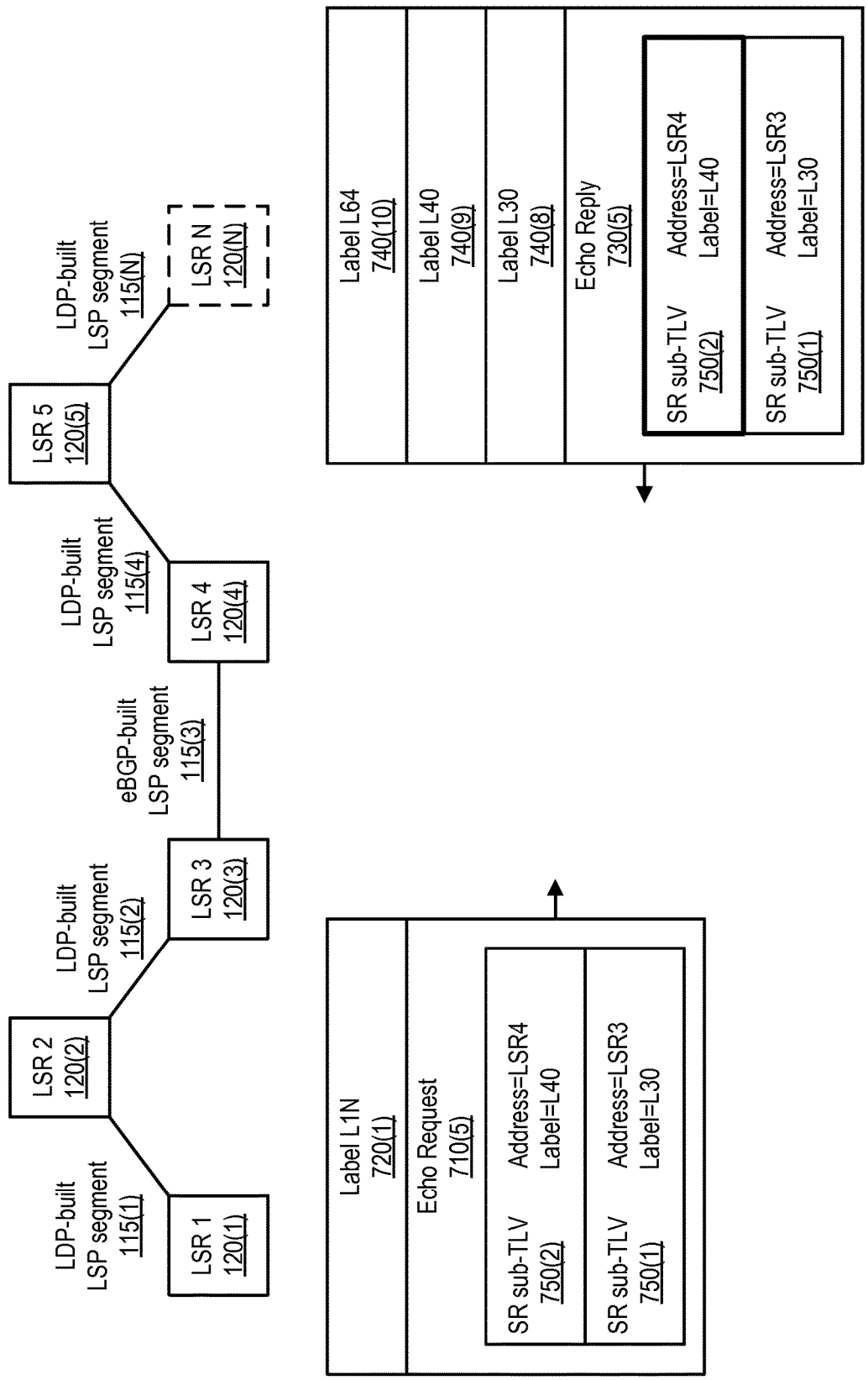

FIG. 7E illustrates a fifth echo request 710(5) generated by initiator LSR 1. Echo reply 740(4) included existing SR sub-TLVs 750(1) and 750(2), which are copied over to subsequent echo request 710(5). Echo request 710(5) is transmitted to the next hop LSR along LSP 125, which is LSR N. LSR N acts as a responder (as illustrated by the broken line) and generates echo reply 730(5). Echo request 710(5) includes existing SR sub-TLVs 750(1) and 750(2). Since LSR N is the egress LSR, there is no need to copy the existing SR sub-TLVs over to echo reply 730(5) (but they may be copied over in another embodiment, depending on the implementation). No FEC change is detected as LSR N, so there is no need for LSR N to add a new SR sub-TLV to the existing stack of SR sub-TLVs. Since initiator LSR 1 is IP unreachable at LSR N (as indicated by the existing SR sub-TLVs in received echo request 710(5)), LSR N generates a return label stack for echo reply 730(5) by extracting the return labels from the existing SR sub-TLV stack (e.g., extracting return label L30 and L40). LSR N imposes the return label stack on echo reply 730(5), which is illustrated as label L30 740(8) and L40 740(9). LSR N also imposes the outgoing label that LSR N uses to reach the IP address in the top-most SR sub-TLV of the existing SR sub-TLV stack as the outer label of echo reply 730(5). As illustrated, the top-most SR sub-TLV in the existing SR sub-TLV stack is SR sub-TLV 750(2) (and is outlined in a thicker solid line), which includes IP address for LSR 4. LSR N imposes label L64, or the label that LSR N uses to reach LSR 4 (e.g., the incoming/outgoing label pair stored in LSR 6's LFIB for LSR 4 is L60/L64), as the outer label of echo reply 730(5). Echo reply 730(5) is label switched back to initiator LSR 1.

It is noted that in one embodiment of ping mode, the transit LSRs would forward the echo request message toward the egress LSR, without checking the payload of the echo request message and would not update the echo request message with segment reachability information (e.g., would not add a new SR sub-TLV to the message). In such an embodiment, a transit connectivity test in traceroute mode can be performed in order to collect segment reachability information from the transit LSRs. An end-to-end connectivity test in ping mode can then be performed, with the segment reachability information (or stack of SR sub-TLVs collected from the transit LSRs) present in the echo request message that is forwarded to the egress LSR. In an alternative embodiment, the transit LSRs would perform the above-discussed operations, but would add any SR sub-TLVs to an echo request message that is forwarded toward the egress LSR (rather than adding any SR sub-TLVs to an echo reply message). In both embodiments, an echo request message received at the egress LSR would contain the stack of SR sub-TLVs that include the reachability information (e.g., IP addresses and return labels) needed by the egress LSR to generate and label switch an echo reply message back to the initiator, even though the initiator's address is unknown (e.g., IP unreachable).

Figure 8A:
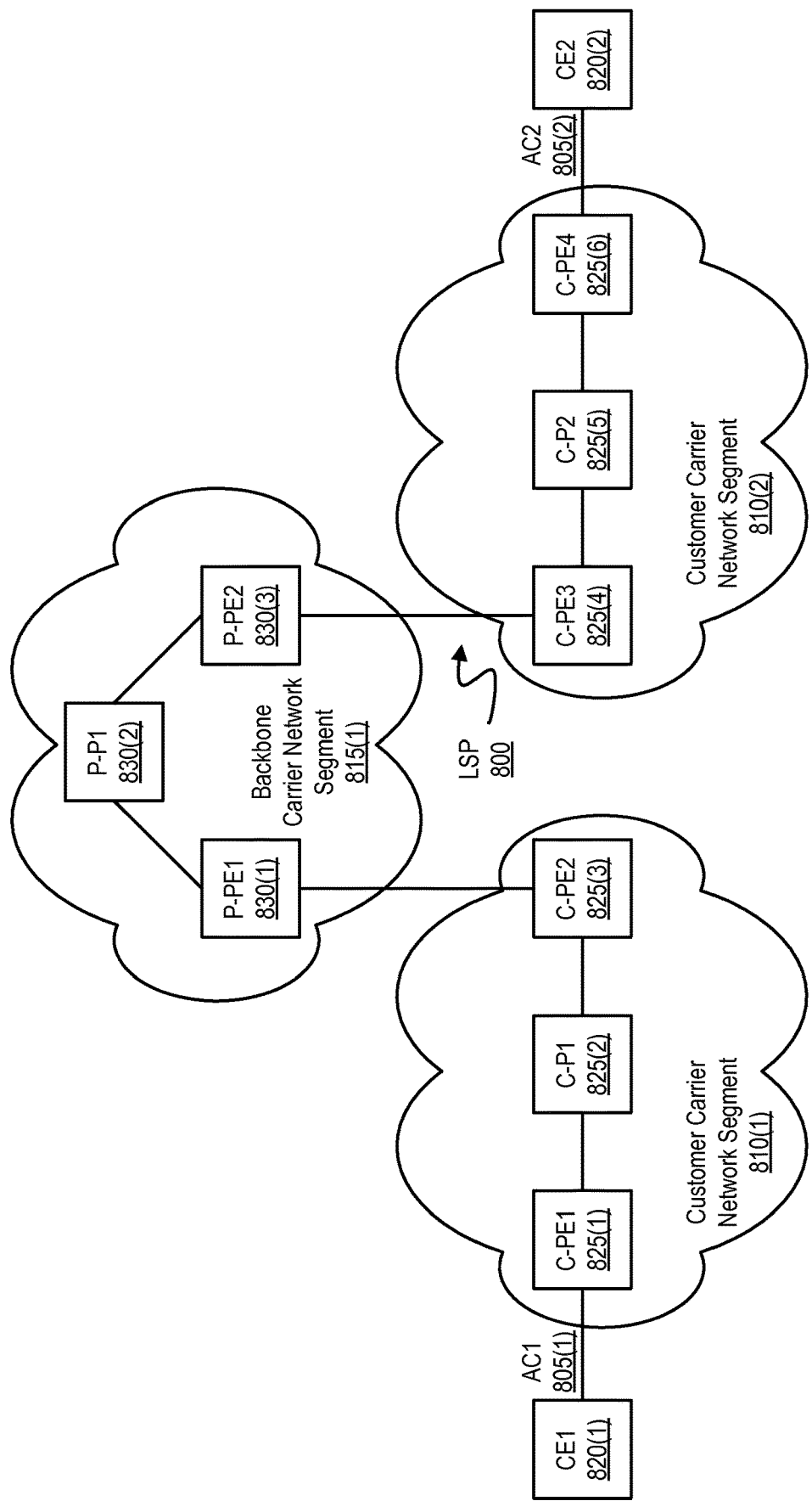
FIG. 8A-8B are block diagrams illustrating example message exchanges during an example connectivity test implementing the present disclosure, according to one embodiment.
Figure 8B:
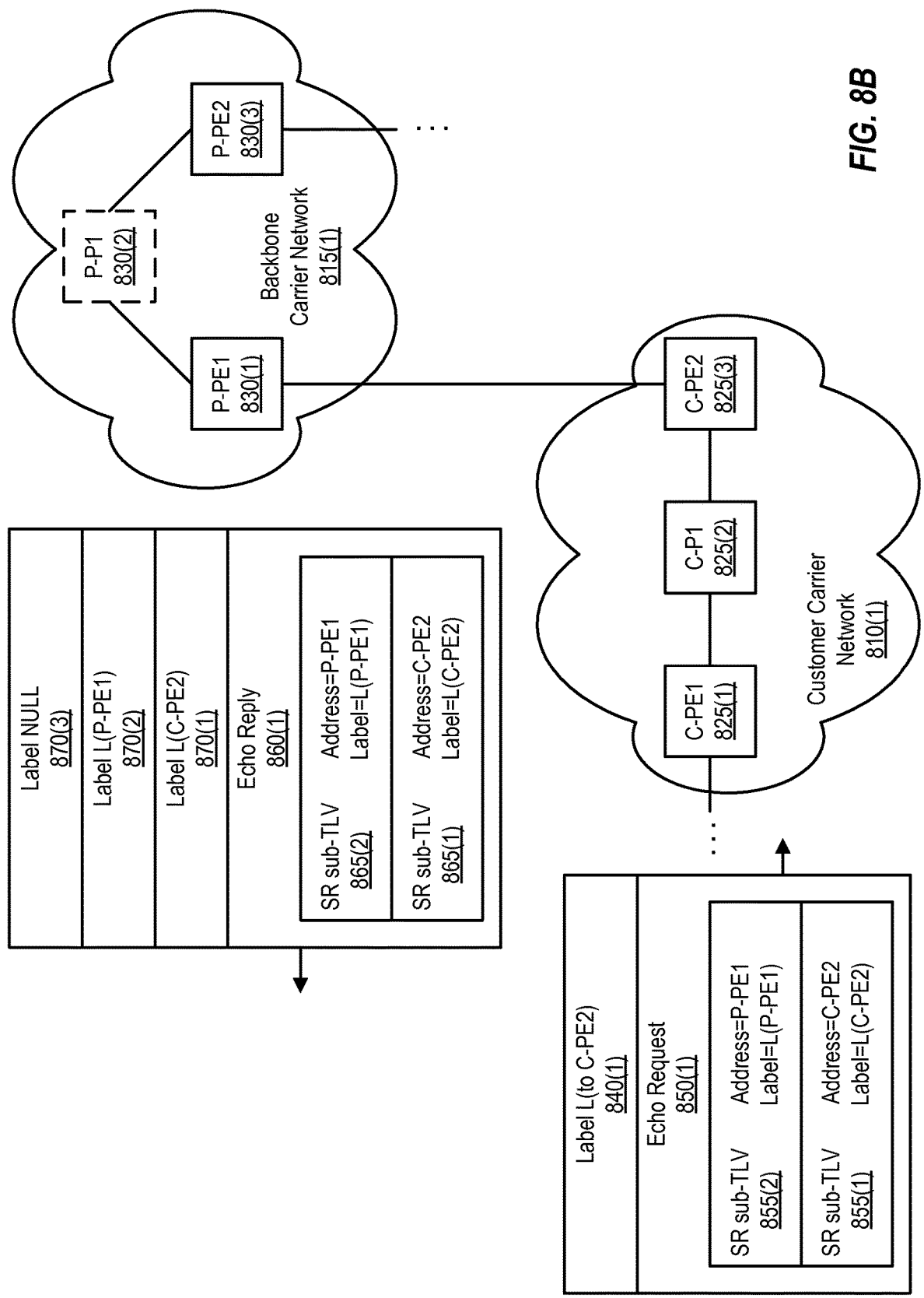

FIG. 8A-8B are block diagrams illustrating an example connectivity test in a carrier supporting carrier (CSC) arrangement, according to the present disclosure. The CSC arrangement includes a customer carrier network segment 810(1), a backbone carrier network segment 815(1), and a customer carrier network segment 810(2). Backbone carrier network segment 815(1) is maintained by a service provider that allows other service providers to use backbone carrier network segment 815(1) to connect parts of their networks, such as customer carrier network segments 810(1) and 810(2). Provider network devices in the customer carrier network segments are denoted by a C, such as C-PE1 and C-PE2 (which are provider edge devices of a customer carrier) and C-P1 and C-P2 (which are provider core devices of a customer carrier). Provider network devices in the backbone carrier network segment are denoted by a P, such as P-PE1 and P-PE2 (which are provider edge devices of the backbone carrier) and P-P1 (which is a provider core device of the backbone carrier). An LSP 800 is built from C-PE1 825(1) to C-PE4 825(6).

Customer edge device CE1 820(1) is attached to customer carrier's provider edge device C-PE1 825(1) via an attachment circuit AC1 805(1), and customer edge device CE2

820(2) is attached to customer carrier's provider edge device C-PE4 825(6) via an attachment circuit AC2 805(2). An attachment circuit is a physical or virtual circuit that attaches a customer edge device to a provider edge device. The CSC arrangement may transport data from a number of customers configured at C-PE1, where C-PE1 is configured with a number of virtual routing and forwarding (VRF) tables. VRF tables allow multiple routing tables to exist on a single edge device, such as one VRF table for each customer VPN or VLAN implemented at the edge device. Thus, multiple customers can share the same infrastructure of the CSC arrangement, while customer VPN and VLAN traffic flows are isolated from each other. Each VRF table includes forwarding information used to forward packets of a particular traffic flow.

FIG. 8B is a block diagram illustrating a particular echo request/echo reply message exchange that occurs at the border of backbone carrier network segment 815(1) and customer carrier network segment 810(1) during a connectivity test. As illustrated, C-PE1 is the initiator that is sending echo request 850(1) to P-P1. Echo request 850(1) includes existing SR sub-TLVs 855(1) and 855(2), which each include IP addresses and return labels of C-PE2 and P-PE1. The message exchange illustrated in FIG. 8B is comparable to the message exchange illustrated in FIG. 7D.

P-P1 receives echo request 850(1) and generates echo reply 860(1). P-P1 copies over the existing SR sub-TLV stack from the received echo request 850(1) into echo reply 860(1), builds a return label stack, imposes the return label stack and outer label on echo reply 860(1), and label switches echo reply 860(1) back to the initiator. Once P-PE1 receives echo reply 860(1), P-PE1 must determine the proper VRF table to use to forward echo reply 830(1). Since the address of C-PE1 is IP unreachable, P-PE1 cannot use C-PE1's IP address to select a VRF table. Thus, in such a CSC arrangement, an IP address alone is not sufficient to successfully forward an echo reply message to the initiator. Instead, P-PE1 uses the outer label of the echo reply (which is the label that P-PE1 previously included in the stack of SR sub-TLVs as the incoming label allocated for the initiator) to determine which VRF table to use to forward the echo reply message. In another embodiment, P-PE1 may extract the corresponding label from the stack of existing SR sub-TLVs that also includes P-PE1's IP address (e.g., P-PE1 may extract the label that P-PE1 previously added to the stack of SR sub-TLVs).

Figure 9A:
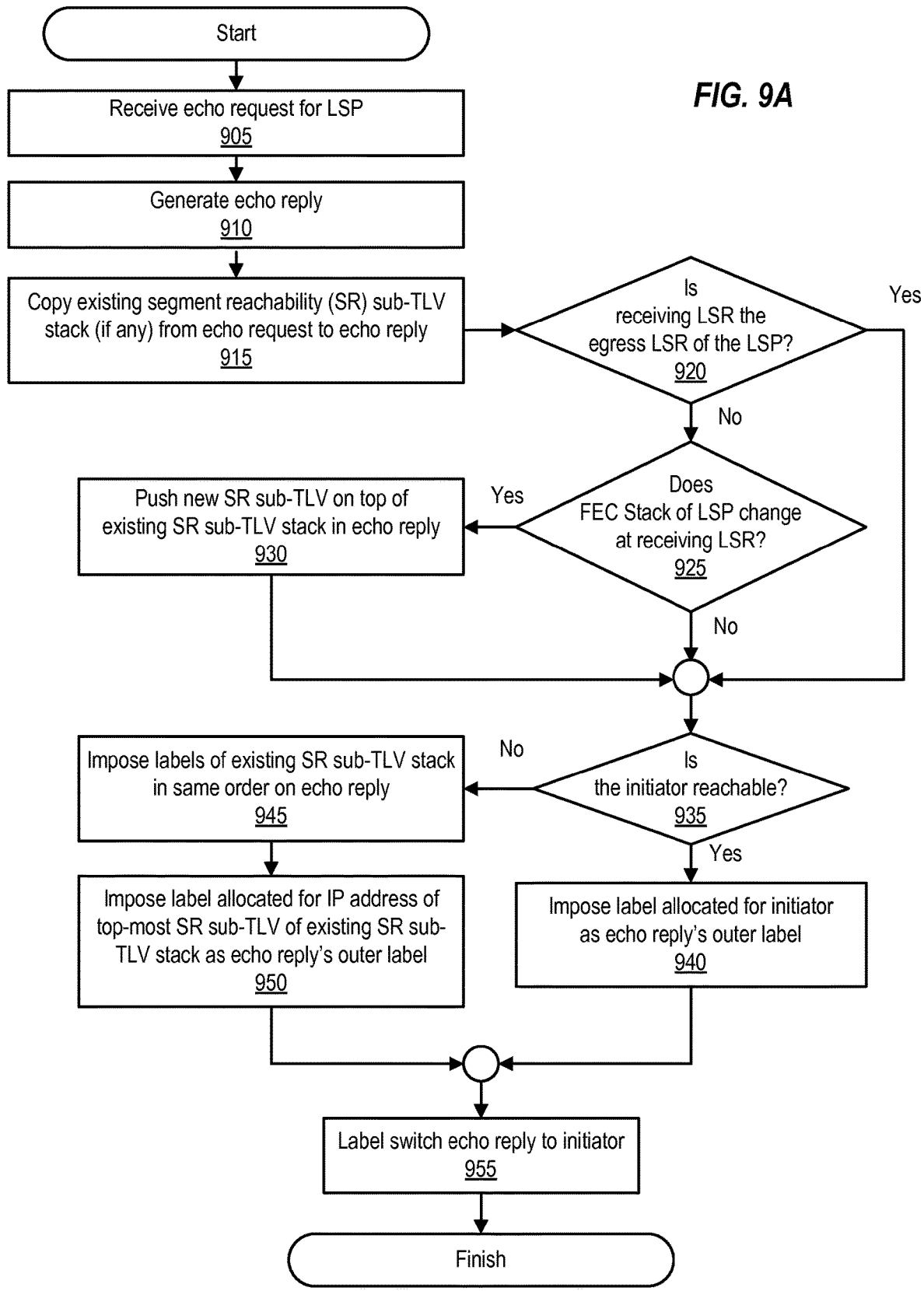
FIG. 9A-9B are flowcharts illustrating acts of example message processing implemented by a segment reachability logic module in cooperation with a connectivity test logic module, according to one embodiment.

FIG. 9A is a flowchart illustrating acts of example message processing (e.g., an echo reply generation process) implemented by a segment reachability (SR) logic module in cooperation with a connectivity test logic module. Echo reply generation is used during a transit connectivity test (or traceroute mode) and an end-to-end connectivity test (or ping mode). SR logic module is configured to interface with the connectivity test logic module (e.g., use existing mechanisms of connectivity test logic module, such as to detect whether the receiving LSR is an egress LSR of the LSP being tested, and whether an FEC stack change occurs at the receiving LSR). SR logic module is configured to be triggered when an echo request message is received at the LSR on which SR logic module is implemented (e.g., SR logic module is triggered when SR logic module detects that an echo request message has been received at a port of the LSR).

The process illustrated in FIG. 9A starts at operation 905, where SR logic module detects that an echo request is received at an LSR. The echo request includes a target FEC stack that identifies an LSP to be tested. An echo request can be received on a port of the receiving LSR and directed internally to connectivity test logic module, which begins connectivity test processing of the echo request. The process continues to operation 910, where the receiving LSR generates an echo reply, using (in part) the existing mechanisms of connectivity test logic module. The process continues to operation 915, where a segment reachability (SR) sub-TLV stack (if any is present in the echo request) is copied from the echo request to the echo reply, using (in part) the existing mechanisms of connectivity test logic module.

The process continues to operation 920, where SR logic module detects whether the receiving LSR is the egress LSR of the LSP being tested. If the receiving LSR is the egress LSR of the LSP, the process continues to operation 935, as further discussed below. If the receiving LSR is not the egress LSR of the LSP, the process continues to operation 925, where SR logic module detects whether the FEC stack of the LSP being tested changes at the receiving LSR. If the FEC stack changes at the receiving LSR, the process continues to operation 930, where a new SR sub-TLV is pushed or added to the top of the existing SR sub-TLV stack in the echo reply. The process then continues to operation 935, as further discussed below.

Returning to operation 925, if the FEC stack does not change at the receiving LSR, the process continues to operation 935, where the SR logic module detects whether the initiator of the echo request is IP reachable. If the initiator is reachable, the process continues to operation 940, where SR logic module imposes a label allocated for the initiator as the echo reply's outer or top label. The process then continues to operation 955, where the echo reply is label switched to the initiator and the process ends.

Returning to operation 935, if the initiator is not reachable (or is IP unreachable), the process continues to operation 945, where SR logic module imposes the return labels of the existing SR sub-TLV stack in the same sequence or order on the echo reply. Operation 945 can also include generating a return label stack from return labels extracted from the existing SR sub-TLV stack and imposing the return label stack on the echo reply. The process continues to operation 950, where SR logic module imposes the label allocated (by the receiving LSR) for the IP address of the top-most SR sub-TLV of the existing SR sub-TLV stack as the echo reply's outer or top label. The process then continues to operation 955, where the echo reply is label switched to the initiator and process ends.

Figure 9B:
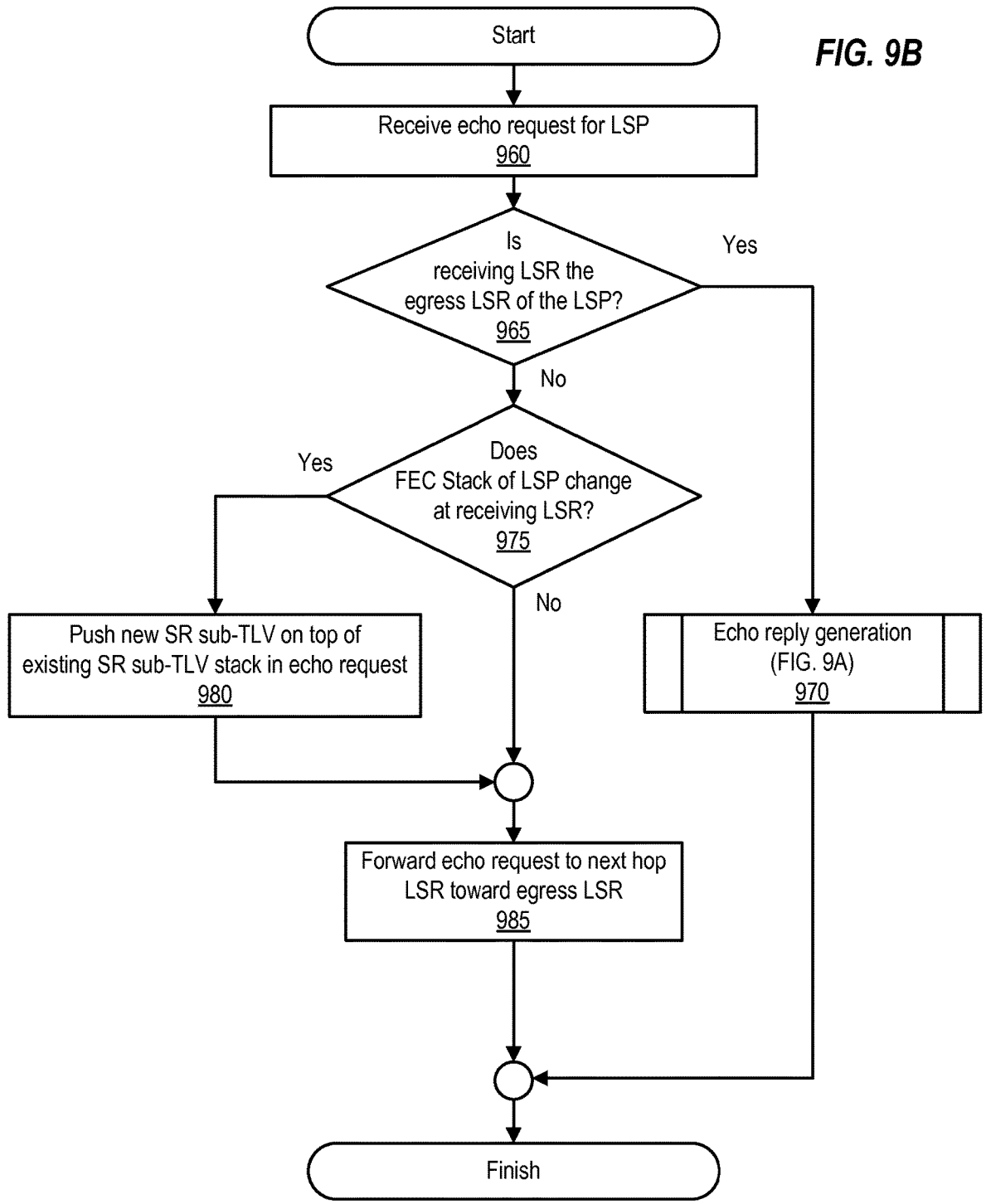

FIG. 9B is a flowchart illustrating acts of example message processing (e.g., an echo request generation process) implemented by a segment reachability (SR) logic module in cooperation with a connectivity test logic module. Echo request generation is used during an end-to-end connectivity test (or ping mode).

The process illustrated in FIG. 9B starts at operation 960, where an echo request is received at an LSR. The echo request includes a target FEC stack that identifies an LSP to be tested. An echo request can be received on a port of the receiving LSR and directed internally to connectivity test logic module. The process continues to operation 965, where SR logic module detects whether the receiving LSR is the egress LSR of the LSP being tested. If the receiving LSR is the egress LSR of the LSP, the process continues to operation 970, where SR logic module performs echo reply generation cooperatively with connectivity test logic module, as further discussed above in connection with FIG. 9A. The process then ends.

Returning to operation 965, if the receiving LSR is not the egress LSR of the LSP, the process continues to operation 975. Operations 975 and 980 are optional operations, which can be implemented in an embodiment where segment reachability information can be added to an echo request. In an embodiment where segment reachability information is not added to an echo request, operation 965 proceeds directly to operation 985, as discussed below. Returning to operation 975, SR logic module detects whether the FEC stack of the LSP being tested changes at the receiving LSR. If the FEC stack changes at the receiving LSR, the process continues to operation 980, where a new SR sub-TLV is pushed or added to the top of the existing SR sub-TLV stack in the echo request. Operation 980 may also include generating a new echo request and copying the SR sub-TLV stack from the received echo request into the new echo request, where the new SR sub-TLV is added to the new echo request. The process continues to operation 985, as discussed below.

Returning to operation 975, if the FEC stack does not change at the receiving LSR, the process continues to operation 985, where the LSR forwards the echo request (or the new echo request) to the next hop LSR toward the egress LSR of the LSP being tested. The process then ends.

Figure 10:
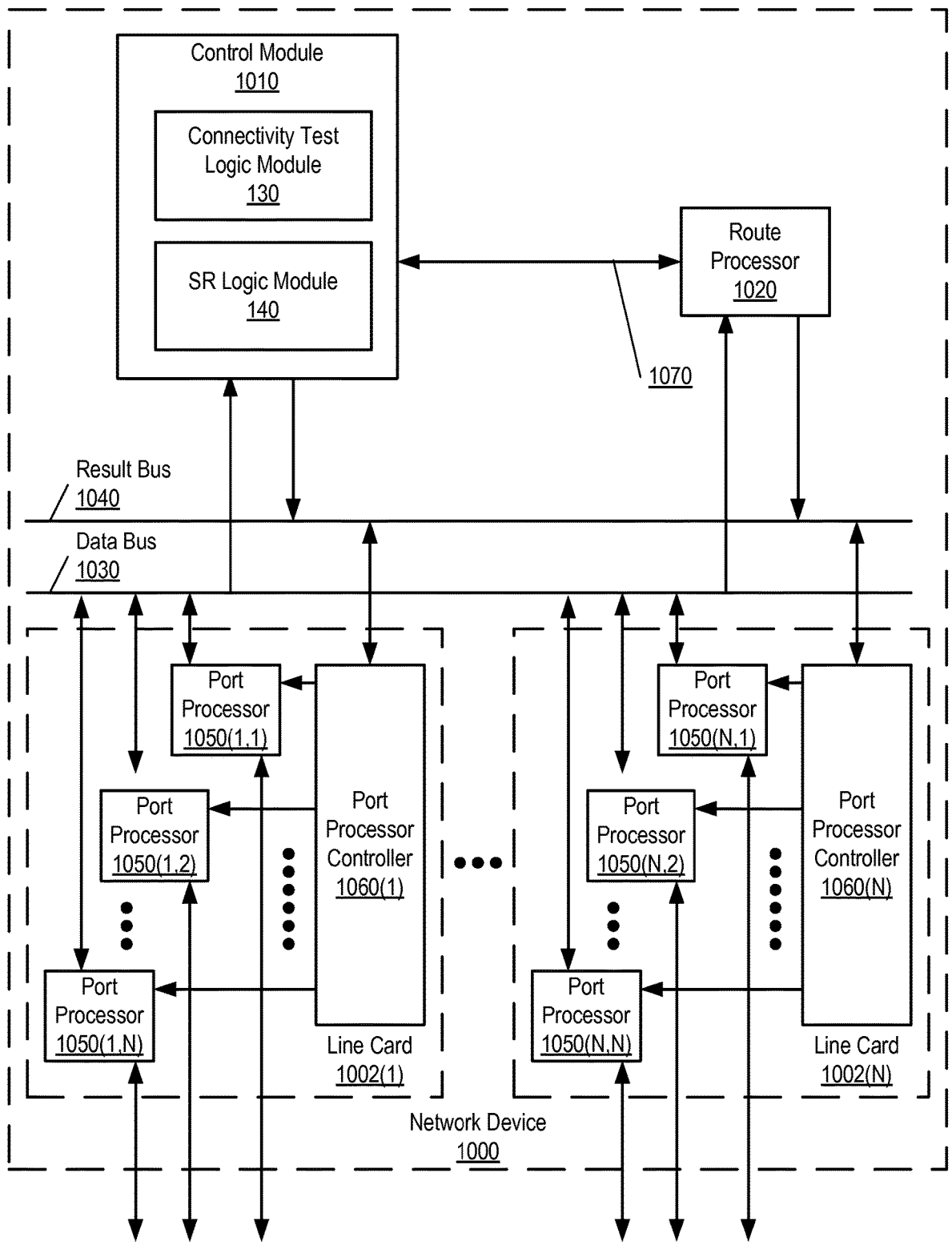
FIG. 10 is a block diagram illustrating components of an example network device in which the present disclosure can be implemented, according to one embodiment.

FIG. 10 is a block diagram illustrating components of an example network device 1000 configured as a routing device (e.g., label switching routing elements 120(1)-(N) of FIG. 1). In this depiction, network device 1000 includes a number of line cards (line cards 1002(1)-1002(N)) that are communicatively coupled to a control module 1010 (which can include a forwarding engine, not shown) and a route processor 1020 via a data bus 1030 and a result bus 1040. Line cards 1002(1)-(N) include a number of port processors 1050(1,1)-1050(N,N) which are controlled by port processor controllers 1060(1)-1060(N). It will also be noted that control module 1010 and route processor 1020 are not only coupled to one another via data bus 1030 and result bus 1040, but are also communicatively coupled to one another by a communications link 1070. It is noted that in alternative embodiments, each line card can include its own forwarding engine.

When a message (e.g., an echo request message and/or an echo reply message) is received by a network device such as network device 1000 (e.g., received by a label switching routing element 120), the message is identified and analyzed by the network device in the following manner. Upon receipt, a message (or some or all of its control information) is sent from one of the port processors 1050(1,1)-1050(N,N) at which the message was received to one or more of those devices coupled to data bus 1030 (e.g., others of port processors 1050(1,1)-1050(N,N), a forwarding engine, and/or route processor 1020). Handling of the message can be determined, for example, by a forwarding engine. For example, a forwarding engine may determine that the message should be forwarded to one or more of port processors 1050(1,1)-1050(N,N). This can be accomplished by indicating to corresponding one(s) of port processor controllers 1060(1)-1060(N) that the copy of the message held in the given one(s) of port processors 1050(1,1)-1050(N,N) should be forwarded to the appropriate one of port processors 1050(1,1)-1050(N,N).

Network device 1000 can implement connectivity test logic module 130 and/or segment reachability logic module 140 in control module 1010 (as shown), or in one of port processor controllers 1060(1)-1060(N) and/or in route processor 1020 in order to implement the present disclosure. Although not shown, network device 1000 can also implement a routing protocol module and/or network reachability protocol module in control module 1010, in one of port processor controllers 1060(1)-1060(N), and/or in route processor 1020 (not shown).

An incoming message (e.g., an echo request message) can be provided to connectivity test logic module 130 via a forwarding engine or port processor of a line card coupled to a port that received the incoming message. Connectivity test logic module 130 is configured to perform connectivity test processing of the incoming message. Segment reachability logic module 140 is configured to communicate with connectivity test logic module 130 and to generate (in cooperation with connectivity test logic module 130) an outgoing message (e.g., an echo reply message), as described above in connection with FIG. 9. Segment reachability logic module 140 is triggered in response to detection of an FEC stack change and/or detection of the initiator of the incoming message being unreachable.

The outgoing message can be provided by connectivity test logic module 130 to a forwarding engine, which can determine that the outgoing message should be forwarded to one or more of port processors 1050(1,1)-1050(N,N) that are configured to transmit the outgoing message (e.g., transmitted to another network device) toward the outgoing message's destination (e.g., the initiator of the incoming message).

Figure 11:
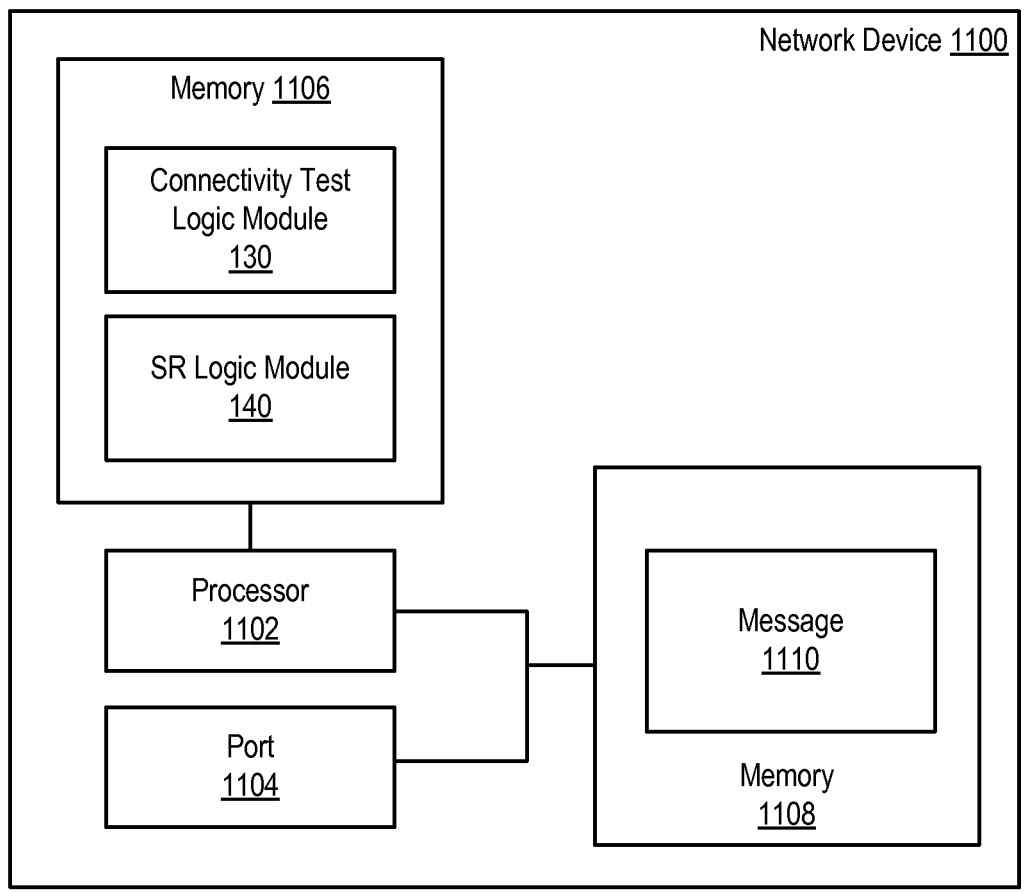
FIG. 11 is a block diagram illustrating components of an example network device in which the present disclosure can be implemented, according to one embodiment.

FIG. 11 is a block diagram illustrating components of an example network device 1100, in which the network device is configured as a routing device (e.g., label switching routing elements 120(1)-(N) of FIG. 1). As illustrated, network device 1100 includes one or more processors 1102 (e.g., microprocessors, PLDs (Programmable Logic Devices), or ASICs (Application Specific Integrated Circuits)) configured to execute program instructions stored in memories 1106 and/or 1108, which are computer readable storage media. Memories 1106 and 1108 can include various types of RAM (Random Access Memory), ROM (Read Only Memory), Flash memory, MEMS (Micro Electro-Mechanical Systems) memory, and the like. Network device 1100 also includes one or more ports 1104 (e.g., one or more hardware ports or other network interfaces that can be linked to other network devices, hosts, servers, storage devices, or the like). Processor 1102, port 1104, and memories 1106 and 1108 are coupled to send and receive data and control signals by one or more buses or other interconnects.

In this example, program instructions executable to implement connectivity test logic module 130 and/or segment reachability logic module 140 are stored in memory 1106. Program instructions executable to implement a routing protocol module and/or a network reachability protocol module can also be stored in memory 1106 and/or in memory 1108 (not shown). Routing information and network reachability information can be stored in one or more routing tables and/or forwarding tables, including a label forwarding information base (LFIB) and/or one or more virtual routing/forwarding (VRF) tables configured in memory 1106 or 1108 (not shown).

Message 1110 (e.g., an echo request message and/or an echo reply message) is stored in memory 1108. In one embodiment, message 1110 can be received from port 1104 (e.g., received from another network device coupled to port 1104), and can be stored in memory 1108 before being provided to connectivity test logic module 130. Connectivity test logic module 130 includes functionality needed to perform connectivity test processing for an incoming message 1110 (e.g., a received echo request message).

Segment reachability logic module 140 includes functionality needed to communicate with connectivity test logic module 130 and to cooperatively generate (with connectivity test logic module 130) an outgoing message 1110 (e.g., an echo reply message), as described above in connection with FIG. 9. In one embodiment, outgoing message 1110 can be generated and stored in memory 1108 before being transmitted via port 1104 (e.g., transmitted to another network device in the network that is coupled to port 1104).

Although the present disclosure has been described with respect to specific embodiments thereof, various changes and modifications may be suggested to one skilled in the art. It is intended such changes and modifications fall within the scope of the appended claims.

What is claimed is:

1. A method comprising:
a first edge label switching routing element (LSR) receiving a first echo request message on a label switch path (LSP),
the first echo request is originated by an initiator;
the first echo request message comprises a stack of one or more segment reachability (SR) sub-TLV (type-length-value) elements, each of which comprises an internet protocol (IP) address and a label allocated to reach the initiator;
wherein the first echo request message comprises an FEC (forwarding equivalence class) stack that identifies the LSP;
the first edge LSR detecting the FEC stack changes at the first edge LSR;
the first edge LSR generating a first SR sub-TLV element in response to detecting that the FEC stack changes at the first edge LSR, wherein the first SR sub-TLV element comprises an IP address of the first edge LSR and a label allocated by the first edge LSR to reach the initiator;
the first edge LSR generating a first echo reply message that comprises a first stack of SR sub-TLV elements, the first stack comprising a copy of the one or more SR sub-TLV elements of the first echo request message and the first SR sub-TLV element;
the first edge LSR attaching one or more labels of the one or more SR sub-TLV elements to the first echo reply message;
the first edge LSR forwarding the first echo reply message with the attached one or more labels towards the initiator;
a second LSR receiving a second echo request message, the second echo request is originated by the initiator;
the second echo request message comprises a plurality of SR sub-TLV elements, which includes the first SR sub-TLV element;
the second edge LSR generating a second SR sub-TLV element, wherein the second SR sub-TLV element comprises an IP address of the second edge LSR and a label allocated by the second edge LSR to reach the initiator;
the second edge LSR generating a second echo reply message that comprises a second stack of SR sub-TLV elements, the second stack comprising the plurality of SR sub-TLV elements of the second echo request and the second SR sub-TLV element;
the second edge LSR attaching labels of the plurality of SR sub-TLV elements of the second echo request to the second echo reply;
the second edge LSR forwarding the second echo reply message with the attached labels of the plurality of SR sub-TLV elements of the second echo request towards the initiator.

2. The method of claim 1 wherein
the second edge LSR is not an egress LSR of the LSP.

3. The method of claim 1 wherein the first edge LSR couples first and second segments of the LSP that were built using first and second label distribution protocols, respectively, wherein the first LSP segment is associated with a first forwarding equivalence class (FEC) and the second LSP segment is associated with a second and different FEC.

4. An apparatus comprising:
a first edge label switching router element (LSR), the first edge LSR comprising:
a first processor; and
a first memory coupled to the first processor and configured to store first instructions executable by the first processor, wherein the first edge LSR is configured to implement a first method in response to execution of the first instructions, the first method comprising:
detect receipt of a first echo request message, wherein
the first echo request message is received by the first edge LSR on a label switch path (LSP),
the first echo request is originated by an initiator;
the first echo request message comprises a stack of one or more segment reachability (SR) sub-TLV (type-length-value) elements, each of which comprises an internet protocol (IP) address and a label allocated to reach the initiator;
the first echo request message comprises an FEC (forwarding equivalence class) stack that identifies the LSP;
detect a change in the FEC stack;
in response to detecting the change in the FEC stack, generate a first SR sub-TLV element, wherein
the first SR sub-TLV element comprises an internet protocol (IP) address of the first edge LSR and a first label allocated by the first edge LSR to reach the initiator;
generate a first echo reply message that comprises a first stack of SR sub-TLV elements, which comprises the first SR sub-TLV element and a copy of the one or more SR sub-TLV elements of the first echo request message;
attach one or more labels of the one or more SR sub-TLV elements to the first echo reply message;
send the first echo reply message with the attached one or more labels towards the initiator;
detect receipt of a second echo request message,
the second echo request is originated by the initiator;
the second echo request message comprises a plurality of SR sub-TLV elements, which includes the first SR sub-TLV element.

5. The apparatus of claim 4, wherein
the first edge LSR is not an egress LSR of the LSP.

6. The apparatus of claim 4 wherein the first edge LSR couples first and second segments of the LSP that were built using first and second label distribution protocols, respectively, wherein the first LSP segment is associated with a first a first FEC and the second LSP segment is associated with a second and different FEC.

7. A non-transitory computer readable storage medium configured to store program instructions that, when executed on a processor, are configured to cause the processor to:
detect receipt of an echo request message, wherein
the echo request is originated by an initiator;
the echo request message comprises a stack of one or more segment reachability (SR) sub-TLV (typelength-value) elements, each of which comprises an internet protocol (IP) address and a label allocated to reach the initiator;
the first echo request message comprises an FEC (forwarding equivalence class) stack that identifies the LSP;
detect a change in the FEC stack;
in response to detecting the change in the FEC stack, generate a new SR sub-TLV element, wherein the new SR sub-TLV element comprises an internet protocol (IP) address of the LSR and a label allocated to reach the initiator;
generate an echo reply message that comprises a new stack, which comprises the new SR sub-TLV element and a copy of the one or more SR sub-TLV elements from the echo request message;
attach the one or more labels of the one or more SR sub-TLV elements to the echo reply message;
forward the echo reply message toward the initiator with the attached one or more labels;
detect receipt of a second echo request message,
the second echo request is originated by the initiator;
the second echo request message comprises a plurality of SR sub-TLV elements, which includes the first SR sub-TLV element.

8. The non-transitory computer readable storage medium of claim 7, wherein the echo request message is received during a transit connectivity test.

* * * * *